United States Patent [19]
Zaumen et al.

[11] Patent Number: 5,881,243
[45] Date of Patent: Mar. 9, 1999

[54] SYSTEM FOR MAINTAINING MULTIPLE LOOP FREE PATHS BETWEEN SOURCE NODE AND DESTINATION NODE IN COMPUTER NETWORK

[76] Inventors: William T. Zaumen, 912 Clara Dr., Palo Alto, Calif. 94303; J. Joaquin Garcia-Luna-Aceves, 82 Lakewood Cir., San Mateo, Calif. 94402

[21] Appl. No.: 852,357

[22] Filed: May 7, 1997

[51] Int. Cl.$^6$ .................................................. G06F 13/00
[52] U.S. Cl. .............................. 395/200.71; 395/200.69; 370/238
[58] Field of Search .................. 395/200.53, 200.54, 395/200.68, 200.71, 200.69; 370/256, 238, 351, 255, 254

[56] References Cited

U.S. PATENT DOCUMENTS

| | | | |
|---|---|---|---|
| 4,466,060 | 8/1984 | Riddle ...................................... | 364/200 |
| 4,967,345 | 10/1990 | Clarke et al. ........................ | 395/200.71 |
| 4,987,536 | 1/1991 | Humblet .............................. | 395/200.71 |
| 5,115,495 | 5/1992 | Tsuhiya et al. ...................... | 395/200.69 |
| 5,265,092 | 11/1993 | Soloway et al. ......................... | 370/238 |
| 5,317,566 | 5/1994 | Joshi ........................................ | 370/238 |
| 5,371,732 | 12/1994 | Brocken et al. .......................... | 370/217 |
| 5,553,078 | 9/1996 | Horie ....................................... | 370/389 |
| 5,561,790 | 10/1996 | Fusaro ...................................... | 395/500 |
| 5,754,543 | 5/1998 | Seid ......................................... | 370/351 |
| 5,805,593 | 9/1998 | Busche ..................................... | 370/396 |

OTHER PUBLICATIONS

J. J. Garcia–Lund Aceves and Shree Murthy, "A Path–Finding Algorithm for Loop–Free Routing," IEEE/ACM Transactions on Networking, Feb. 1997.

Pierre A. Humblet, "Another Adaptive Distributed Shortest Path Algorithm," IEEE Transactions on Communications, vol. 39, No. 6, Jun. 1991, pp. 995–1003.

Bala Rajagopalan and Michael Faiman, "A Responsive Distributed Algorithm for Shortest–Path Routing within Autonomous Systems," Internet Working Research and Experience, vol. 2, 51–69 (1991).

J. J. Garcia–Lund Aceves, "Loop–Free Routing Using Diffusing Computations," IEEE/ACM Tranactions on Networking, vol. 1, No. 1, Feb. 1993.

*Primary Examiner*—Moustafa M. Meky

[57] ABSTRACT

A system for maintaining routing tables at each router in a computer network. The system is based on (a) a feasibility condition that provides multiple loop-free paths through a computer network and that minimizes the amount of synchronization among routers necessary for the correct operation of a routing algorithm, and (b) a method that manages the set of successors during the time it synchronizes its routing-table update activity with other routers, in order to efficiently compute multiple loop-free paths, including the shortest path, through a computer network.

14 Claims, 8 Drawing Sheets

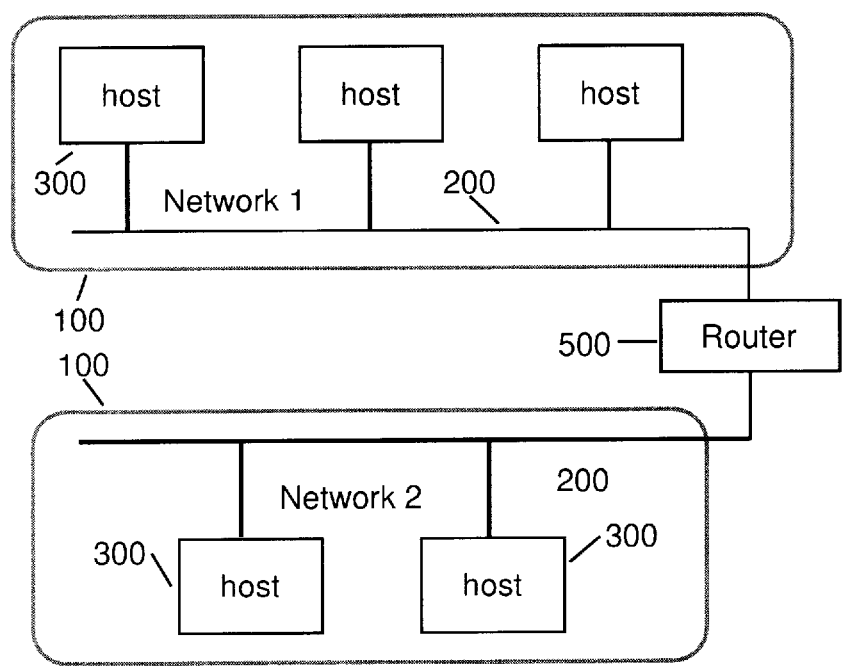
Figure 1: A Computer Network

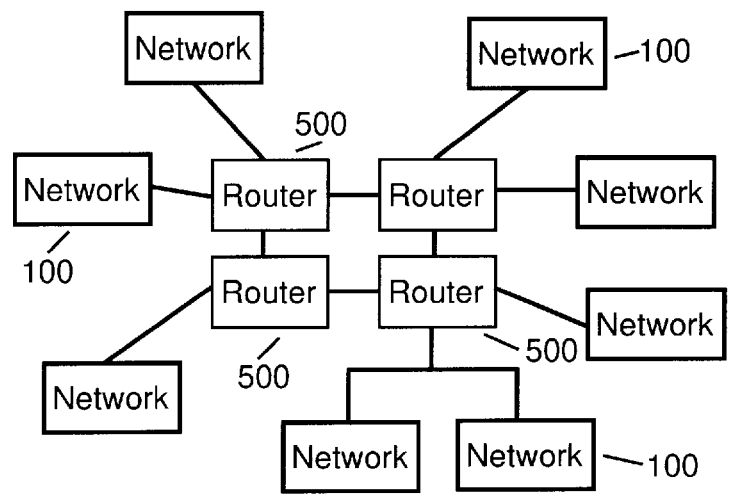
Figure 2: An Internetwork

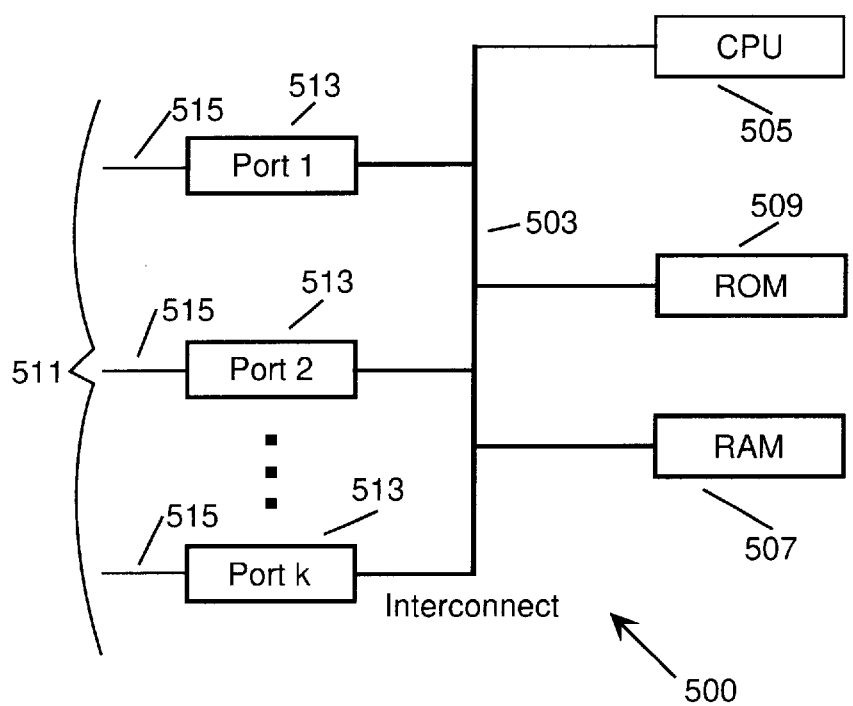
Figure 3: A Block Diagram of a Typical Router

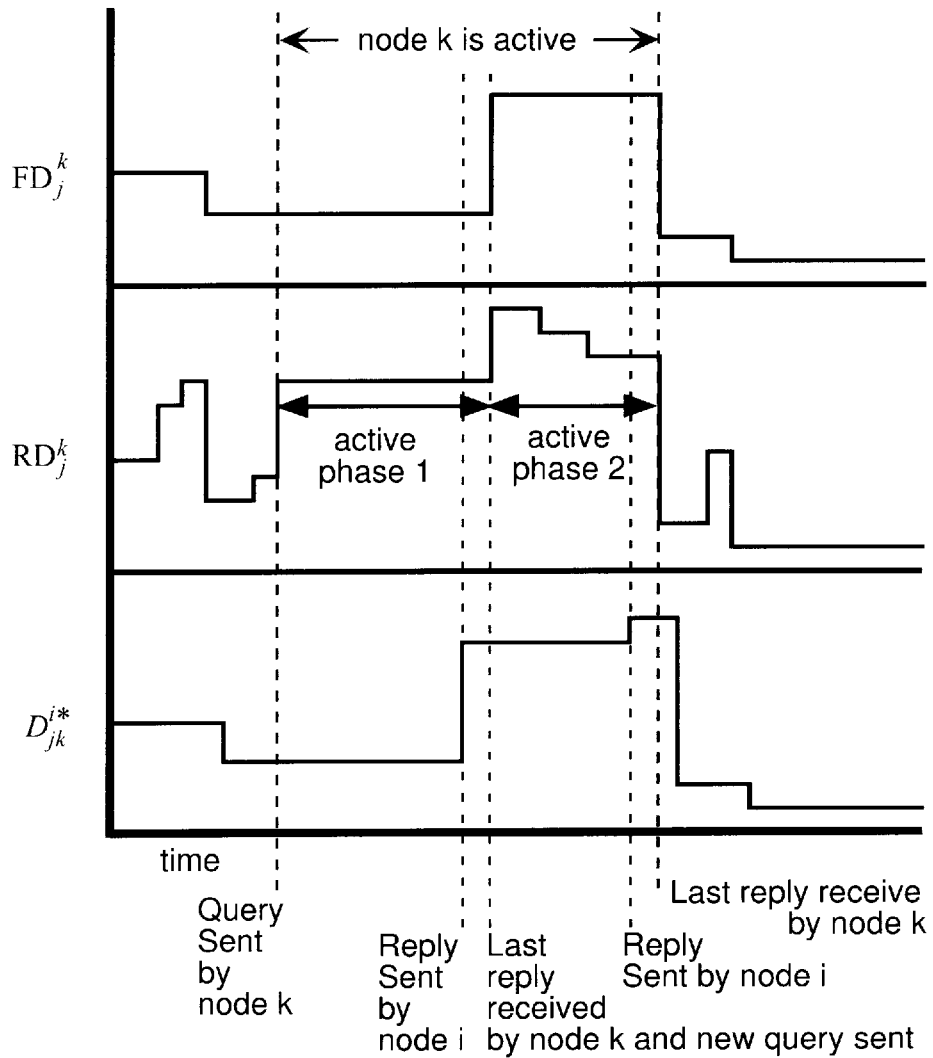
Figure 4: Feasibility Condition and Reported Distances

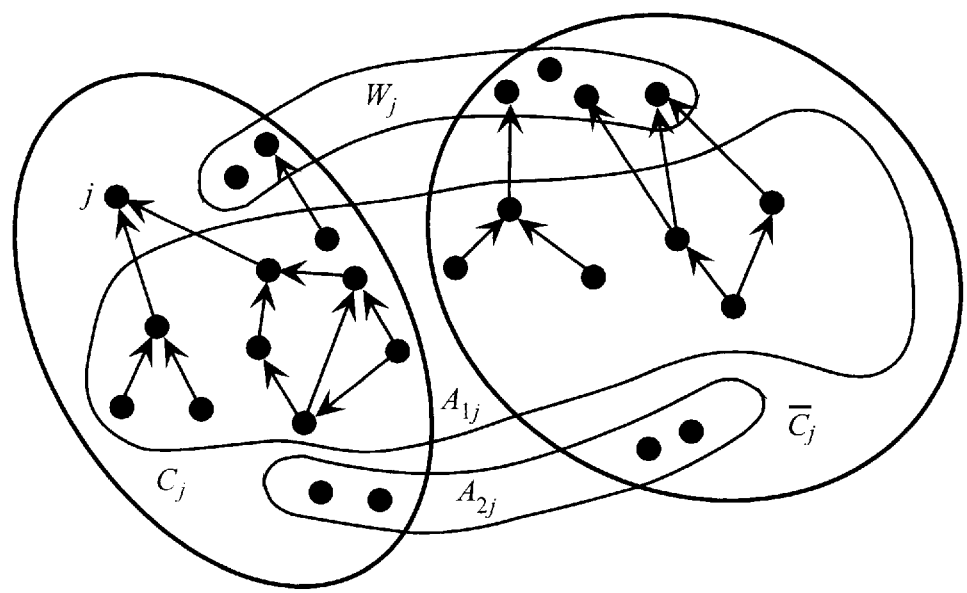
Figure 5: The Successor Graph and Sets $W_j$, $A_{1j}$, and $A_{2j}$

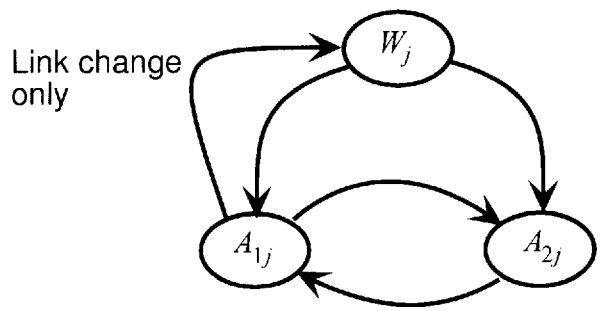
Figure 6: Transitions between Sets $W_j$, $A_{1j}$, and $A_{2j}$

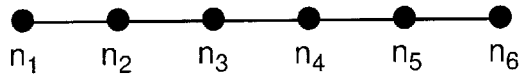
Figure 7: Topology for Simulation with Link-Cost Increases

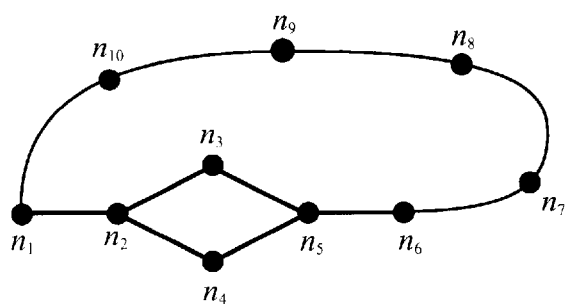
Figure 8: Topology for Simulation with Multiple Link Changes

SYSTEM FOR MAINTAINING MULTIPLE LOOP FREE PATHS BETWEEN SOURCE NODE AND DESTINATION NODE IN COMPUTER NETWORK

FIELD OF THE INVENTION

The present invention relates to processes and devices used to route data packets from an end station (host computer) to another end station. The end stations may be in different computer networks.

BACKGROUND OF THE INVENTION

In a computer network or internetwork, there is a problem of physically routing message traffic (data packets) between nodes and providing the shortest path between any two nodes. A computer network is formed of three or more nodes connected by links. Each node may be a general-purpose computer or a specialized device, such as a router or switch. A link is a communication path that connects two or more nodes with one another. An internetwork is formed of multiple computer networks interconnected by nodes, each node may be a general-purpose computer or a specialized device, such as a router. Each link has a length (or cost) associated with it. A bidirectional link has a length in each of its two directions. A broadcast link has a single cost. A network path also has a single length or cost associated with it. Once a shortest path is provided, the number of nodes or the length of a link in the network may change so that a new shortest path must be found. Because providing a shortest path uses computer resources, and because routing traffic inefficiently wastes network resources, it is important to quickly and accurately find each shortest path.

Data packets may, for example, be routed from an end station in one network to an end station in another network. The devices that route the data packets (routers) map the address of a destination network or end station into either a path or the next router (or successor) along the path to the destination. To accomplish their function, routers need to implement a routing protocol, which supports two main functions: route computation and data packet forwarding.

Three types of approaches exist in the prior art for providing a shortest path. The first type is the link-state approach (also called a topology-broadcast approach), wherein a node must know the entire network topology. Each router uses this information to compute the shortest path and successor router (or next hop) in the path to each destination. The node broadcasts update messages to every node in the network or internetwork. Each node originates update messages containing the cost of the links adjacent to that node and forwards updates received from other nodes, taking care to ensure that the same update is not forwarded more than once. Well known examples of the link-state approach are the new ARPANET routing protocol and the OSPF (Open Shortest Path First) protocol. A primary disadvantage of the link-state approach is that the maintenance of an up-to-date version of the entire network topology at every node may constitute excessive storage and communication overhead in a large network. Another disadvantage is that the path computations required by the link-state approach are computationally expensive. A third disadvantage is that the shortest perceived path may contain loops, which lengthen a path and cause data packers to visit the same node multiple times. The existence of loops, even temporarily, is a detriment to overall performance of a computer network.

The distance-vector approach requires that a router knows only the distances to its own destinations and to those destinations reported by other nodes, together with some additional information that varies depending on the particular protocol. The router maintains the length of the shortest path from each of its adjacent nodes to every destination node and the next node in that shortest path. The node sends update message, containing (as a minimum) distance to other nodes, to only its adjacent nodes. Well known examples of the distance vector approaches are RIP (Routing Information Protocol), RIPv2 (RIP version 2), BGP (Border Gateway Routing Protocol), and Cisco's proprietary EIGRP (Enhanced Interior Gateway Routing Protocol).

RIP and RIPv2 use variants of the distributed Bellman-Ford (DBF) algorithm for shortest-path computation. The main disadvantages of protocols based on DBF are the creation of routing loops and the possibility of counting to infinity. A node counts to infinity when it increments its distance to a destination node, until a predefined maximum value is reached. A number of attempts have been made to solve the counting to infinity and looping problems by increasing the amount of information exchanged among nodes or by making nodes disregard link changes for a predefined period of time before updating their routing tables. None of these approaches, however, has been successful.

BGP includes the complete path to a destination in a routing-table update. Because nodes can determine if they are part of a path reported by a neighbor node to a destination, they avoid long-term loops and counting to infinity.

A patent illustrative of the distance vector approach is U.S. Pat. No. 4,466,060 to Riddle. The Riddle patent disclosed an adaptive distributed message routing algorithm where each node transmits different information to its adjacent nodes. The transmitted routing information arranges the nodes of the network in a hierarchical fashion that takes on the graphical form of a tree structure with the transmitting node at the root of the tree and the remaining nodes stemming from the root. A similar approach to the Riddle patent is used by Garcia-Luna-Aceves and Murthy in "path finding algorithms" (J. J. Garcia-Luna-Aceves and S. Murthy, "A Path-Finding Algorithm for Loop-Free Routing," *IEEE/ACM Transactions on Networking*, February 1997) as well as others (e.g., P. Humblet, "Another Adaptive Shortest-Path Algorithm", *IEEE Transactions on Communications*, Vol.39, No.6, June 1991, pp. 995–1003; B. Rajagopalan and M. Faiman, "A Responsive Distributed Shortest-Path Routing Algorithm within Autonomous Systems," *Internetworking: Research and Experience*, Vol.2, No.1, March 1991, pp. 51–69). In this type of distance-vector algorithms, a node communicates to its neighbors its shortest path routing tree by incrementally sending the distance and second-to-last hop node identifier to each destination. These algorithms eliminate counting to infinity, and the loop-free path finding algorithm by Garcia-Luna-Aceves and Murthy eliminates routing loops as well.

EIGRP eliminates counting to infinity and looping using the Diffusing Update Algorithm (DUAL) (J. J. Garcia-Luna-Aceves, "Loop-Free Routing Using Diffusing Computations," *IEEE/ACM Transactions on Networking*, Vol. 1, No. 1, February 1993). DUAL selects routes to be inserted into a routing table based on feasible successors. A successor is a neighboring router used for packet forwarding that has a least-cost path to a destination that is guaranteed not to be part of a routing loop. From router i's standpoint, a feasible successor toward destination j is a neighbor router k that satisfies a feasibility condition that is based on values such as the router's own distance and its neighbor's distance to the destination.

The three feasibility conditions in the prior art are the DIC (Distance Increase Condition) and the CSC (Current Successor Condition) and the SNC (Source Node Condition). The DIC can be summarized as follows: If a node i detects a decrease in either 1. the length of a link to one of its adjacent neighbors or
2. the distance from an adjacent node to a destination node then node i can choose any adjacent neighbor as the new successor node en route to the destination node, provided that the sum of the length from node i to the adjacent neighbor and the length from the adjacent neighbor to the destination node is less than or equal to the smallest assigned length from node i to the destination node.

The CSC can be summarized as: If a node i detects a change in either 1. the length of a link to one of its adjacent neighbors or
2. the distance from an adjacent node to a destination node then node i can choose any adjacent neighbor as the new successor node en route to the destination node, provided that the length from the new adjacent neighbor to the destination node is less than or equal to the smallest assigned length from the original adjacent neighbor to the destination node.

The SNC can be summarized as: If a node i detects a change in either 1. the length of a link to one of its adjacent neighbors or
2. the distance from an adjacent node to a destination node then node i can chose any new adjacent neighbor as long as the length from the adjacent neighbor to the destination node is less than the feasible distance from node i to the destination. The feasible distance is the minimum of all of the distances to the destination that node i has reported since the last time node i either initialized itself or began its participation in a diffusing computation.

When the feasibility condition is met, node i can carry out a local computation to determine a new path independently of other nodes, thus saving computational resources. It is important to realize, however, that the feasibility conditions DIC, CSC, and SNC are not always met. When a feasibility condition is not met at a node i, node i must perform a diffusing computation, wherein node i must coordinate with other nodes to find a new shortest path. The SNC can be met easier than the DIC or CSC, for example, and thus the SNC allows for fewer diffusing computations than these other feasibility conditions. Therefore, because it is important to meet a feasibility condition as often as possible to save computational resources, there has been a need to develop feasibility conditions that can be more easily satisfied in order to avoid diffusing computations as much as possible.

As mentioned above, diffusing computations require larger amounts of computer resources than local computations. One prior art system supports multiple diffusing computations concurrently by maintaining bit vectors at each node. The bit vectors specify, for each adjacent node and for each destination node, the number of correspondences which were originated by and the number of correspondences which must be answered by the node maintaining the bit vector. The problem with this system is that the bit vectors can become exceedingly large in a large network, thus consuming large amounts of computational resources. Another prior art system eliminates these bit vectors by requiring a node to 'freeze' a designated successor as long as the node is part of the diffusing computation (i.e., while a diffusing computation proceeds for a particular destination, each node participating in the diffusing computation for that destination must keep the same next hop for that destination). In addition, a node is only allowed to participate in one diffusing computation at a time for each destination. A state machine is used to process messages that arrive at a node while the node participates in a diffusing computation, and determines if a new diffusing computation is necessary after the previous one terminates. This prior art system classifies routing messages as updates, queries, and replies. Queries and replies are used for coordinating diffusing computations. In all of the prior art systems based on diffusing computations and feasibility conditions, the feasibility conditions are based on the current value of link costs and of distances reported by neighbors, and a node raises its feasible distance only when it starts or joins a diffusing computation.

Thus, even though diffusing computations of the prior art may provide correct results, they are inefficient. Because of this inefficiency, there has been a need in the prior art to develop new approaches to diffusing computations which are able to conserve computational and communication resources. In addition, while prior art systems based on feasibility conditions can provide multipath routing in the absence of diffusing computations, these systems can provide only a single successor during the course of a diffusing computation, and must wait until the diffusing computation terminates before providing a better path. The result of this constraint is that even if a better path to the destination is becomes available, that path cannot be used until the diffusing computation terminates.

The third approach to routing in computer networks and internetworks is the approach based on link vector algorithms (J. J. Garcia-Luna-Aceves and J. Behrens, "Distributed, Scalable Routing based on Vectors of Link States," *IEEE Journal on Selected Areas in Communications,* Vol 13, No. 8, October 1995). The basic idea of LVA consists of asking each node to report to its neighbors the characteristics of each of the links it uses to reach a destination through one or more preferred paths, and to report to its neighbors which links it has erased from its preferred paths. Using this information, each router constructs a source graph consisting of all the links it uses in the preferred paths to each destination. LVA ensures that the link-state information maintained at each router corresponds to the link constituency of the preferred paths used by routers in the network or internet. Each router runs a local algorithm or multiple algorithms on its topology table to compute its source graph with the preferred paths to each destination. Such algorithms can be any type of algorithm (e.g., shortest path, maximum-capacity path, policy path) and the only requirements for correct operation are for all routers to use the same algorithm to compute the same type of preferred paths, and that routers report all the links used in all preferred paths obtained. The disadvantage of LVA is that it may allow temporary routing loops to occur in the network or internetwork.

BRIEF DESCRIPTION OF THE DRAWINGS

FIG. 1 is a diagram of two computer networks connected through a router.

FIG. 2 is a diagram of a number of computer networks connected by routers. In this figure, the routers are connected to each other by router-to-router links.

FIG. 3 is a block diagram of a typical router according to the present invention. Such routers will use a combination of hardware and software to perform packet-forwarding functions.

FIG. 4 illustrates the mechanism used in the feasibility condition called DMC defined below. This figure shows the relationship between various quantities maintained by the invention (and defined below) for a node i and a neighboring node k. These quantities include the distance $RD_j^k$ reported in updates and queries sent by node k, the value of $D_{jk}^{i*}$, and the value of $FD_j^k$ as a function of time. The values of $D_{jk}^{i*}$ reflect the values of $RD_j^k$, but are offset in time because of propagation delays for messages traveling between node k and node i. The figure illustrates how DMC implies that $FD_j^k < D_{jk}^{i*}$.

FIG. 5 classifies the nodes in a network according to the state of the routing tables in nodes implementing the current invention. The region $C_j$ consists of those nodes that have a path to destination j, and the region $\overline{C}_j$ contains those nodes that do not have a path to destination j. The sets shown in FIG. 5 have the following interpretation (the meaning of the terms active and passive are defined in the invention summary):

$W_j$ contains nodes that are active and that have no successors.

$A_{1j}$ contains nodes that have successors.

$A_{2j}$ contains nodes that are passive and have no successors. Since these nodes must have a feasible distance of $\infty$, these nodes cannot be in the successor sets of any other nodes according to DMC.

As described in the invention summary below, with stable link costs and network topology, set $W_j$ will eventually become empty. As a result, all nodes in $C_j$ will have a path to the destination j and all nodes in $\overline{C}_j$ will be members of set $A_{2j}$ and consequently will have empty successor sets and infinite distance to the destination.

FIG. 6 illustrates how nodes may change their set membership from one set defined in FIG. 5 to another.

FIG. 7 shows a linear topology used in an example that shows the behavior of the present invention when link costs increase.

FIG. 8 shows a more complex topology used in an example that shows the behavior of the present invention when multiple link costs change before the routing tables converge.

SUMMARY OF THE INVENTION

The present invention provides for a feasibility condition that can be more easily met than the DIC, CSC, and SNC conditions, thus saving computational and network resources by avoiding unnecessary diffusing computations. The feasibility condition of the present invention is denoted as the DMC (Diffusing Multipath Condition), and is illustrated in FIG. 4. As with SNC, DMC assigns a feasible distance to each node, but unlike SNC, DMC increases this feasible distance at the end of a diffusing computation instead of the start of the diffusing computation. Unlike these previous feasibility conditions, DMC maintains an upper bound on the feasible distance of its neighbors based on the type of message sent. At node i, for destination j, and neighboring node k, this bound is denoted as $D_{jk}^{i*}$. When a link from node i to node k is established or fails, or when node i initializes itself, $D_{jk}^{i*}$ is set to $\infty$. Afterwards, $D_{jk}^{i*}$ is set to the minimum distance received in a message from node k. When node i receives a query from node k, however, node i also keeps track of the minimum distance received from node k since the query. When node i sends node k a reply, node i sets $D_{jk}^{i*}$ to the minimum distance received from node k since the query, decreasing $D_{jk}^{i*}$ when a lower distance is reported in a message from node k as before.

DMC also requires that a node i never send a routing message containing a distance less than its feasible distance for the destination, that node i raises its feasible distance only when all its neighbors have replied to a query, and that node i raise its feasible distance for the destination no higher than the minimum distance sent in a message since the query and no higher than the distance in the query itself. In addition, when a node sends a query for a destination, it must not send a second query for that destination until it has received replies from all its neighbors. A link failure is treated as an implicit reply.

If the feasible distance at node i for destination j is denoted by $FD_j^i$, and the feasible distance at node k for destination j is denoted as $FD_j^k$, then DMC ensures that $FD_j^k \leq D_{jk}^{i*}$. If node i chooses as its successor for destination j any node k such that $D_{jk}^{i*} < FD_j^i$, then it trivially follows that $FD_j^k < FD_j^i$ at every instant of time. If there were a loop, it would follow that $FD_j^i < FD_j^i$, which is impossible, so DMC ensures loop freedom at every instant of time. This has the added benefit of providing multipath routing of every instant of time, allowing paths with lengths longer than that of the shortest path.

The use of DMC leads to a reduction in diffusing computations over what is achievable in prior art systems. In particular, if node i receives a sequence of updates containing increasing distances, it may have to start a diffusing computation to raise its feasible distance even though it will not have to change its successors. With DMC, this diffusing computation may not be avoided because, as long as only updates are sent, node i can determine (using DMC) that its neighbors feasible distance has not increased. This can substantially reduce the number of routing messages sent through the network, leading to improved performance.

Because there is no need to freeze successors as there is in prior art systems, the present invention also provides a new mechanism for managing diffusing computations that is more efficient than the mechanisms used in prior art systems. This mechanism exploits DMC, which guarantees loop free paths at all instances of time. Given a destination j, a node i is said to be passive if it is not currently participating in a diffusing computation and is said to be active if it is participating in a diffusing computation. The successor set $S_j^i$ of node i for destination j is defined as the set of neighboring nodes k for which $D_{jk}^{i*} < FD_j^i$. Diffusing computations are managed so as to obey the following constraints:

1. A passive node with no successors must have infinite feasible distance.
2. A node that has successors is not allowed to lower its feasible distance or send a reply to a node in its successor set if that would cause its successor set to empty unless that node has first raised its feasible distance to $\infty$. Node i may, however, have a finite feasible distance and also have no successors as a result of a topology change (e.g., a link failure). When this occurs, node i must become active.
3. An active node that has no successors and that has received the last reply to its query must (if necessary) send queries containing a distance of $\infty$.
4. A node that has sent a query, perhaps followed by updates, all containing a distance of $\infty$, must become passive when it receives its last reply to that query.
5. A node that receives a query from some node that is not in its successor set must sent that node a reply.
6. If a node can become passive when it receives the last reply to a query it must become passive.

These constraints imply the following. Suppose that there have been a sequence of topology changes in the network.

After the last change, suppose that node i has a nonempty successor set. Since DMC prevents loops, if one follows the chain of successors, one must eventually reach either the destination or a node with no successors. The constraints ensure that a diffusing computation will eventually terminate, although a new diffusing computation may start. A node with no successors, however, must raise its feasible distance to ∞ by sending queries containing a distance of ∞. As a result, such nodes will eventually either obtain a successor or become passive with a distance of ∞ and no successors. Thus, eventually all nodes will either have a path to the destination or will be passive with no successors. This ensures that the computation always terminates. The relationship between nodes maintained by the present invention is illustrated in FIG. 5, which assigns nodes to various sets based on their state (active or passive) and the number of successors a node has. Transitions between these sets allowed by the present invention are illustrated in FIG. 6.

In addition, the constraints allow the following behavior: if an active node processes an update or link-state change that results in the shortest path to the destination satisfying its feasibility condition if all pending replies are sent, the node may send all of its replies. If the node is active, it becomes the root of a diffusing computation. This mechanism avoids the need to wait for diffusing computations to terminate before using new paths, and in addition, since replies will be sent earlier than otherwise, it allows diffusing computations to terminate quicker than is possible with prior art systems.

The present invention is also the first to provide multiple loop-free paths to destinations even when nodes are synchronizing their routing table update activities with other nodes.

DETAILED DESCRIPTION OF THE INVENTION

A method and apparatus for distributed loop-free routing in computer networks will now be described. In the following description, numerous specific details are set forth in order to provide a thorough understanding of the present invention. It will be evident, however, to those skilled in the art that these specific details need not be used to practice the present invention. In other instances, well-known structures and circuit have not been shown in detail in order to avoid unnecessarily obscuring the present invention.

Turning to FIG. 1, a pair of computer networks are shown. These are connected through a router 500. Each computer network 100 includes a bus, ring, or other communications medium 200, and a number of attached computers 300. FIG. 2 shows a plurality of computer networks interconnected by routers. This configuration forms an internet. Lines shown connecting routers in FIG. 2 may be point-to-point connections or may be networks with additional computers attached.

FIG. 3 shows a block diagram of a typical router 500 according to the presently preferred embodiment. An internal data bus 503 connects a central processing unit (CPU) 505, a random access memory (RAM) 507, a read-only memory (ROM) 509 and multiple ports depicted at 511. Each individual port 513 is attached to a link 515 that in turn connects to another port of another router, or to a network. Data are sent and received through each of the ports 513. Data received from a port 513 are stored in the RAM 507, examined by the CPU 505, and sent out through a port 513 toward an appropriate destination.

Routing information is exchanged directly only between neighbors (adjacent routers) by means of routing messages; this is done either periodically, after routers detect changes in the cost or status of links, or after routers receive routing messages from neighbors. Each routing message contains a distance vector with one or more entries, and each entry specifies a distance to a given destination, an identifier specifying that destination, and an indication of whether the entry constitutes an update, query, or reply. The router hardware and software is responsible for ensuring that routing-message events and link-status events are delivered in the order in which they occur, that queries and replies are transmitted reliably, and that if a sequence of updates is transmitted, the last update is received. Providing hardware or software to meet this requirement is a well-understood application of communication protocol design.

The present invention provides an efficient method for determining the routing messages (of the type described above) to send in response to changes in link cost or status and in response to other routing messages, while providing loop-free paths to each destination and the shortest path to each destination upon convergence. This method can be described by an algorithm. Embodiments of this algorithm can use either hardware, software, or some combination. In addition, while the present invention is described in terms of a router, switches and other devices can also make use of routing information, and the present invention can be embodied purely in software, using locally available topology information. In this latter case, the computations for multiple nodes would be performed at one location instead of being distributed across a network.

The algorithm can be formally described by the following psuedocode description, which is based on the computer language Modula-II. We assume that a particular embodiment of the algorithm will provide a suitable definition for a cost (which is constrained to obey the rules of addition), a node ID (which indicates each addressable entity or range of entities in a network), and a representation of certain events (query, update, and reply for messages; linkdown, linkup, and linkchange for changes in link states). Certain functions are assumed to be provided by exporting them to software or hardware that monitors attached network interfaces. These functions are LinkUp, LinkDown, LinkChange, and Message. The embodiment is also assumed to provide a function, named Send in the psuedocode, that causes a list of events (updates, queries, and replies) to be sent in a data packet or sequence of packets that make up a routing message. The function Send is called at appropriate points. Mathematical notation is used instead of actual statements in a computer language because there are many ways in which the algorithm can be coded. Similarly, an append statement is used to add a routing-message event, represented as an ordered triple [type, destination, cost], to a list of messages to be transmitted when Send is called. As stated above, these messages are to be delivered in the order provided. In the textual description of the invention, such triples are also used to describe routing-message events.

For notational convenience in the psuedocode, the index j always refers to the destination, the index i always refers to a particular node in the computer network, and the index m is the index associated with a link for which a change was detected. The index k is used to refer to some neighbor of node i. The following symbols represent the tables, indexed by identifiers (indicated by subscripts and superscripts) denoting various nodes in a network, that are used to describe the present invention:

$N^i$: the set of nodes or routers connected through a link with node i; a node in that set is said to be a neighbor of node i.

$FD_j^i$: is the feasible distance or feasible length at node i for destination j.

$S_j^i$: is the set of neighbors of node i that are used as successors of node i for destination j. This set represents the neighbors to use along all loop-free paths maintained by the routing-algorithm.

$l_k^i$: the cost or distance or length of a link in an event that changes the cost or status of a link. If a link fails, the cost is assumed to by $\infty$. This cost, length, or distance is also called the neighbor-node length.

$D_{jk}^i$: the distance reported by a neighbor in an update, query, or reply. This distance is also called the neighbor-to-destination length.

$D_{jk}^{i*}$: a table maintaining an upper bound on a neighbor's feasible distance.

$D_{min}^{ij}$: the cost of a path to destination j along the shortest path.

$\check{D}_{jk}^{i*}$: a table maintaining an upper bound on the feasible distance of a neighbor after a query from the neighbor is processed and before the following reply is sent.

$RD_j^i$: the cost for destination j that will be used in messages sent to neighbors.

$\widetilde{RD}_j^i$: the last value of $RD_j^i$ in a query or in an update that was broadcasted to all neighbors.

$S_{jP1}^i$: the value the successor set would have after an active-to-passive transition.

$QS_j^i$: the set of nodes for which a query has been received, but for which a reply has not been sent. One of the requirements for convergence is that $QS_j^i \subset S_j^i$.

$V^i$: the set of all nodes or routers currently known to node i, excluding node i.

$Z_j^i$: the set of neighbors of node i that lie along a shortest path to destination j, or shortest-path set.

$a_j^i$: a flag that is true if node i is active for destination j.

$r_{jk}^i$: a flag that is true if node i has sent a query to node k for destination j but has not yet received a reply.

The operation of the invention can be described formally by psuedocode. As with any such description, there are various equivalent formulations that are obvious to someone skilled in the art. The psuedocode description is the following:

```
module RoutingAlgorithm;
import procedure Send;                (* To transmit messages on lists *)
import type NodeID, Cost;             (* Externally provided types *)
import type Event;                    (* Enum for message and link events: *)
                                      (* query, update, replyfor messages; *)
                                      (* else linkdown, linkup, linkchange. *)
export LinkUp, LinkDown,
  LinkChange, Message;
var l_k^i: Cost;                      (* Cost of a link *)
var D_jk^i: Cost;                     (* Neighbor's reported distance *)
var FD_j^i: Cost;                     (* Feasible Distance *)
var D_jk^i*: Cost;                    (* Upper bound on neighbor's FD *)
var D_min^ij: Cost;                   (* minimum distance to destination *)
var Ď_jk^i*: Cost;                    (* D_jk^i* to use after replying *)
var RD_j^i: Cost;                     (* Distance to report to neighbors *)
var R̃D_j^i: Cost;                    (* Last transmitted RD_j^i *)
vars S_j^i: set of NodeID;            (* Successor Set *)
var S_jP1^i: set of NodeID;           (* for passive S_j^itest *)
var QS_j^i: set of NodeID;            (* Query Successor Set *)
var N^i: set of NodeID;               (* Neighboring nodes *)
var V^i: set of NodeID;               (* All nodes ≠ i currently known *)
var Z_j^i: set of NodeID;             (* Neighbors along shortest paths *)
var a_j^i: set of NodeID;             (* true when active *)
var r_jk^i: boolean;                  (* true if waiting for a reply *)

procedure Common (j: NodeID);
begin
  for all k ∈ N^i do
    if k ∈ QS_j^i then
      D_jk^i* ← Ď_jk^i*; append [reply,j,RD_j^i] to list k;
    elsif RD_j^i ≠ R̃D_j^i then
      append [update,j,RD_j^i] to list k;
    end;
  end;
  QS_j^i ← ∅; R̃D_j^i ← RD_j^i;
end Common;

procedure MakeUpdates (j: NodeID);
begin
  if RD_j^i ≠ R̃D_j^i then
    for all k ∈ N^i do
      append [update,j,RD_j^i] to list k;
    end;
    R̃D_j^i ← RD_j^i;
  end;
end MakeUpdates;

procedure MakeQueries (j: NodeID);
begin
  R̃D_j^i ← RD_j^i;
  for all k ∈ {χ ∈ N^i | l_χ^i ≠ ∞} do
    r_jk^i ← true;
    append [query,j,RD_j^i] to list k;
  end;
  if (∀k ∈ N^i):r_jk^i false then FD_j^i = ∞ end;
end MakeQueries;

procedure SelectiveReply (e: Event; j, m: NodeID; c: Cost);
(*
* Can be change to implement various policies for replying to
* nodes in QS_j^i while active. *)
begin
  if ord(QS_j^i) ≤ 1 then return end;
  if e = query ∧ m ∈ QS_j^i then
    QS_j^i ← QS_j^i - {k};
    D_jm^i* ← Ď_jm^i*;
    if D_jm^i* ≥ FD_j^i then
      S_j^i ← S_j^i - {m}
    end;
    append [reply, j, RD_j^i] to list m;
  end;
end SelectiveReply;

procedure ModifyTables (e: Event; j: NodeID; m: NodeID);
begin
  a_j^i ← ((∃k) : r_jk^i = true);
  D_min^ij ← min{D_jk^i + l_k^i | k ∈ N^i}; D_jm^i* ← min(D_jm^i*,D_jm^i);
  Z_j^i ← {k ∈ N^i | D_jk^i + l_k^i = D_min^ij ∧ D_min^ij ≠ ∞};
  if e = query then
    Ď_jm^i* ← D_jm^i;
    if D_jm^i* ≥ FD_j^i then
      D_jm^i* ← Ď_jm^i*; append [reply, j, RD_j^i] to list m;
    else QS_j^i ← QS_j^i ∪ {m};
    end;
  elsif e = linkdown then
    r_jm^i ← false; D_jm^i* ← ∞; Ď_jm^i* ← ∞;
    N^i ← N^i - {m}; QS_j^i ← QS_j^i - {m};
  elsif e = reply then r_jm^i ← false; Ď_jm^i* ← min(Ď_jm^i*, D_jm^i);
  elsif m ∈ QS_j^i then D_jm^i* = min(Ď_jm^i*,D_jm^i);
  else Ď_jm^i* ← D_jm^i*;
  end;
  S_j^i ← {k ∈ N^i | D_jk^i* < FD_j^i};
  S_jP1^i ← {k ∈ N^i | Ď_jk^i* < min(D_min^ij,FD_j^i)};
end ModifyTables;

procedure PassiveTransition(e: Event; j, m: NodeID; c: Cost);
begin
  if Z_j^i ∩ S_jP1^i ≠ ∅ then
    RD_j^i ← D_min^ij; S_j^i ← S_jP1^i; FD_j^i ← min(FD_j^i,D_min^ij);
    Common (j);
  else
    if S_j^i = ∅ then RD_j^i ← ∞;
    else RD_j^i ← Choose(e,j,m,c);
    end;
    if FD_j^i ≠ ∞ then MakeQueries(j);
    else Common (j);
    end;
  end;
```

```
end PassiveTransition;
procedure ActiveTransition (e: Event; j, m: NodeID; c: Cost);
var S_jP2^i: set of NodeID;
begin
    if Z_j^i ∩ S_jP1^i ≠ ∅ ∧ RD_j^i ≧ D_min^ij ∧ ChoosePassive(e,j,m,c) then
        FD_j^i ← min(FD_j^i, D_min^ij);
        S_j^i ← S_jP1^i; RD_j^i = D_min^ij;
        Common (j);
    else
        if ∀ (k) : r_jk^i = false then
            S_jP2^i ← {k ∈ N^i | D̃_jk^i* < min(D_min^ij, RD_j^i)};
            if S_jP2^i ∩ Z_j^i ≠ ∅ then
                FD_j^i ← min(RD_j^i, D_min^ij); RD_j^i ← D_min^ij ;
                S_j^i ← S_jP2^i;
                Common (j);
            elsif RD_j^i = ∞ then
                S_j^i ← S_jP2^i; FD_j^i ← D_min^ij;
                Common(j);
            else
                FD_j^i ← RD_j^i;
                S_j^i ← {k ∈ N^i | D_jk^i* < FD_j^i};
                if S_j^i = ∅ then RD_j^i = ∞;
                else RD_j^i = min{D_jk^i + l_k^i | k ∈ QS_j^i};
            end;
            MakeQueries (j);
        end;
        else SelectiveReply (e, j, m, c);
    end;
end;
end ActiveTransition;
procedure Transition (e: Event; j: NodeID; m: NodeID; c: Cost);
begin
    ModifyTables(e, j, m);
    if a_j^i then ActiveTransition (e, j, m, c);
    else PassiveTransition (e, j, m, c);
end;
end Transition;
procedure Init1;
begin
    N^i ← ∅, V^i ← ∅,
    for all k ∈ {χ | l_χ^i < ∞}
    do
        N^i ← N^i ∪ {χ};
    end;
    for all k ∈ {χ | l_χ^i < ∞}
    do
        Init2 (k);
    end;
    RD_i^i ← 0; R̃D_i^i ← ∞;
    MakeUpdates (i);
    Send;
end Init1;
procedure Init2 (χ: NodeID);
begin
    V^i ← V^i ∪ {χ};
    FD_χ^i ← ∞; RD_χ^i ← ∞; R̃D_χ^i ← ∞; D_min^iχ ← ∞;
    S_χ^i ← ∅, QS_χ^i ← ∅,
    for all k ∈ N^i
    do
        D_χk^i ← ∞; D_χk^i* ← ∞; D̃_χk^i* ← ∞;
        r_χk^i ← false;
    end;
end Init2;
procedure LinkUp(m: NodeID; c: Cost);
begin
    l_m^i ← c; V ← V ∪ {m};
    if m ∉ N^i then
        N^i ← N^i ∪ {m};
        Init2 (m);
    end;
    append [update, i, RD_i^i] to list m;
    for all j ∈ N^i do
        D_jm^i ← ∞; D_jm^i* ← ∞; D̃_jm^i* ← ∞;
        r_jm^i ← false;
        if RD_j^i < ∞ then
            append [update, j, RD_j^i] to list m;
        end;
    end;
    Send;
end LinkUp;
procedure LinkDown(m: NodeID);
begin
    l_m^i ← ∞;
    for all j ∈ V^i do
        D_jm^i = ∞;
        Transition(linkdown, j, m, ∞);
    end;
    Send;
end LinkDown;
procedure Linkchange(m: NodeID; c: Cost);
begin
    l_m^i ← c;
    for all j ∈ V^i do
        Transition(linkchange, j, m, c);
    end;
    Send;
end LinkChange;
procedure Message(e: Event; j: NodeID; m: NodeID; c: Cost);
begin
    if i = j ∧ e = query then
        append [reply, i, RD_i^i] to list m;
    elsif i ≠ j then
        if j ∉ V^i then
            Init2 (j);
        end;
        D_jm^i ← c;
        Transition (e, j, m, c);
    end;
    Send;
end Message;
function Choose(e: Event; j, m: NodeID; c: Cost): Cost;
begin
    if (e = linkdown ∧ m = j) ∨ (e = query ∧ c = ∞) then
        return ∞;
    elsif QS_j^i ≠ ∅ then
        return min{D_jk^i + l_k^i | k ∈ QS_j^i};
    elsif {D̃_jk^i* ≦ FD_j^i} ≠ ∅ then
        return min{D_jk^i + l_k^i | D̃_jk^i* ≦ FD_j^i}; else
        return ∞; end;
end Choose;
function ChoosePassive(e: Event; j, m: NodeID; c: Cost): Boolean;
begin
    return QS_j^i ∪ {k ∈ Ni | D̃_jk^i* = ∞ } = ∅,
end Choose Passive;
begin
    Init1;
end RoutingAlgorithm.
```

The operation of the algorithm described by the above psuedocode is as follows. When a router i is turned on or the system otherwise initializes itself by setting $RD_i^i$ to 0 and by setting $N^i$, $V^i$ to $\emptyset$. For all destinations j, $S_j^i$, $QS_j^i$, and $Z_j^i$ are set to $\emptyset$, and the values $FD_j^i$, $RD_j^i$, $D_{min}^{ij}$, and $\widetilde{RD}_j^i$ are set to $\infty$. For all destinations j and all neighbors k of router i, $D_{jk}^i$, $D_{jk}^{i*}$, and $\tilde{D}_{jk}^{i*}$ are set to $\infty$, and the flag $r_{jk}^i$ is set to false. If a destination or neighboring node is unknown, the corresponding entries do not exist are and not used. At this point, the router sends an routing-message event to all neighbors, containing the triple [update, i, 0] to advertise a distance of zero from itself.

The router then responds to messages and link events, and it is assumed that after initialization, a router will obtain a link-up event for every operational neighboring router k connected to the current router i by a functioning link. A router will also obtain a link-up event if a link that was previously not operational becomes operational. The events that can occur are link-up events, link-down events, link-cost-change events, and routing-message events. In the psuedocode, these are handled by the functions LinkUp, LinkDown, LinkChange, and Message respectively. These set a few table entries, and, except for LinkUp, call the function Transition. The function Transition takes four arguments—an indicator encoding the type of event (linkdown, linkchange, update, query, reply), a node id j for a destination, a node id m for the link associated with the event or message, and the cost associated with the event. The cost associated with the event is either the new link cost (if the event is linkdown or linkchange) or the distance reported in a routing-message event (if the event is update, query, or reply). The function Transition embodies behavior common to the processing of all events. As mentioned previously, a routing message consists of a vector of routing events. These routing events are processed in the order in which they occur in the routing message. The behavior of the invention is not dependent on how these events are grouped into messages, as long as the order in which they occur is preserved, both when received and when transmitted.

When a link-up event is processed by router i, the new neighbor m is added to the sets $N^i$ and $V^i$, and if the new neighbor was not previously in $N^i$, then the following variables are initialized: $S_m^i$, $QS_m^i$, and $Z_m^i$ are set to $\emptyset$, and the values $FD_m^i$, $RD_m^i$, $D_{min}^{im}$, and $\widetilde{RD}_m^i$ are set to $\infty$. For all destinations j and all neighbors k of router i, $D_{mk}^i$, $D_{mk}^{i*}$, and $\tilde{D}_{mk}^{i*}$ are set to $\infty$, and the flag $r_{mk}^i$ is set to false. Next, a routing-message event [update, i, $RD_i^i$] is queued for transmission to neighbor m, and for all destinations j, $D_{jm}^i$, $D_{jm}^{i*}$, and $\tilde{D}_{jm}^{i*}$ are set to $\infty$, and the flag $r_{jm}^i$ is set to false. In addition, for all destinations j, if $RD_j^i<\infty$, a routing-message event [update, j, $RD_j^i$] is queued for transmission to node m. Finally, all queued routing-message events are sent.

When a link-down event is processed by router i, indicating that the link to neighbor m is not available, the link cost $l_m^i$ is set to $\infty$, and for all destinations j, $D_{jm}^i$ is set to $\infty$ and the function Transition(linkdown, j, m, $\infty$) is called. Then all queued routing-message events are sent.

When a link-change event is processed by router i, the link cost $l_m^i$ is updated to reflect the new value c of the cost of the link from router i to neighboring router m. Then for every destination j, Transition(linkchange,j,m,c, is then called. Finally, all queued routing-message events are sent.

When a routing-message event is processed, the various field in the event are read to determine the event type e (update, query, or reply), the destination node ID j that appears in routing-message event, the neighboring node m that sent the routing-message event, and the distance c in the routing-message event. If j matches the node ID i of the current router, and the event type is query, then a reply routing-message event [reply, i, $RD_i^i$] is queued for transmission to node m. Otherwise, there are two possibilities. The first is that the destination in the routing-message event matches the current router. For this case, the event is simply ignored. The second case is that the destination in the routing-message event does not match the current router. In this case, if j is a not member of $V^i$, then we must initialize table entries: $S_j^i$, $QS_j^i$, and $Z_j^i$ are set to $\emptyset$, and the values $FD_j^i$, $RD_j^i$, $D_{min}^{ij}$, and $\widetilde{RD}_j^i$ are set to $\infty$; for all neighbors k of router i, $D_{jk}^i$, $D_{jk}^{i*}$, and $\tilde{D}_{jk}^{i*}$ are set to $\infty$, and the flag $r_{jk}^i$ is set to false. The second case continues by setting $D_{jm}^i$ to c and then calling Transition(e, j, m, c). Finally, (in both cases), all queued routing-message events are sent.

The function Transition(e, j, m, c) describes the handling of an event e (linkdown, linkchange, update, query, reply), for destination node ID j, in a routing message or link-cost/status change for neighbor m, with a new cost c. The function Transition starts by doing some preliminary table updates (describe in the psuedocode by the function ModifyTables) in the following sequence:

1. a flag $a_j^i$ is set to true if the $r_{jk}^i$ flag is true for any value of k, where k is the node ID of a neighbor of node i.

While a flag is used in this description, any number of techniques are possible for tracking this information.

2. $D_{min}^{ij}$ is updated to contain the minimum value of $D_{jk}^i+l_k^i$ for all neighbors of router i.
3. $D_{jm}^{i*}$ is updated to be the minimum of $D_{jm}^{i*}$ and $D_{jm}^i$.
4. $Z_j^i$ is updated to contain the set of all neighboring nodes k for which $D_{jk}^i+l_k^i=D_{min}^{ij}$, unless $D_{min}^{ij}=\infty$ in which case $Z_j^i$ becomes the empty set $\emptyset$.
5. If the event is a query, then the following sequence of operations are performed:
    (a) $\tilde{D}_{jm}^{i*}$ is set to $D_{jm}^i$.
    (b) If $D_{jm}^{i*} \geq FD_j^i$, then $D_{jm}^{i*}$ is set to $\tilde{D}_{jm}^{i*}$. Then a routing-message event [reply, j, $RD_j^i$] is queued for transmission to node m.

else if the event is a linkdown event, then the following sequence of operations are performed:
    (a) $r_{jm}^i$ is set to false.
    (b) $D_{jm}^{i*}$ and $\tilde{D}_{jm}^{i*}$ are set to $\infty$.
    (c) m is taken out of the sets $N^i$ and $QS_j^i$.

else if the event is a reply, then the following sequence of operations are performed:
    (a) $r_{jm}^i$ is set to false.
    (b) $\tilde{D}_{jm}^{i*}$ is set to the minimum of $\tilde{D}_{jm}^{i*}$ and $D_{jm}^i$.
    else if m is a member of $QS_j^i$, then $\tilde{D}_{jm}^{i*}$ is set to the minimum of $\tilde{D}_{jm}^{i*}$ and $D_{jm}^i$, otherwise $\tilde{D}_{jm}^{i*}$ is set to $D_{jm}^{i*}$.
6. $S_j^i$ is set to the set of neighboring nodes such that, for any neighbor k in this set, $D_{jk}^{i*}$ is less than $FD_j^i$.
7. A temporary variable $S_{jP1}^i$, is set to the set of neighboring nodes such that for any neighbor k in this set, $\tilde{D}_{jk}^{i*}$ is less than the minimum of $D_{min}^{ij}$ and $FD_j^i$.

After these preliminary operations, the function Transition uses the flag $a_j^i$. If $a_j^i$ is true, the current router i was in the active state when Transition was called, and if $a_j^i$ is false, i was in the passive state when Transition was called. Transition behaves differently in each case.

In the case where $a_j^i$ is true, Transition first performs a test to see (a) if the sets $Z_j^i$ and $S_{jP1}^i$ have any common members, (b) if $RD_j^i$ is greater than $D_{min}^{ij}$, and (c) if a function named ChoosePassive with arguments (e, j, m, c) obtained from Transition returns a value of true. If (a), (b), and (c) are all true, Transition sets $FD_j^i$ to $D_{min}^{ij}$ if this would decrease $FD_j^i$, sets $S_j^i$ to $S_{jP1}^i$, sets $RD_j^i$ to $D_{min}^{ij}$, and calls the function Common defined in the psuedocode and described below to queue the appropriate routing-message events for transmission to neighboring nodes. If (a), (b), and (c) are not all true, Transition checks if there is any neighbor k for which $r_{jk}^i$ is true. If one exists, Transition calls SelectiveReply(e, j, m, c), which is defined below. If one does not exist, Transition first sets a local variable $S_{jP2}^i$ to the set of all neighboring nodes k such that $\tilde{D}_{jk}^{i*}$ is less than the minimum of $RD_j^i$ and $D_{min}^{ij}$, and then makes the following mutually exclusive choices:

1. if $S_{jP2}^i$ and $Z_j^i$ have a common member, then the following steps are performed:
    (a) $FD_j^i$ is set to the minimum of $RD_j^i$ and $D_{min}^{ij}$.
    (b) $RD_j^i$ is set to $D_{min}^{ij}$.
    (c) $S_j^i$ is set to $S_{jP2}^i$.
    (d) the function Common is called to queue routing-message events for transmission to neighboring nodes.
2. else if $RD_j^i$ has a value of $\infty$, then the following steps are performed:
    (a) $S_j^i$ is set to $S_{jP2}^i$.
    (b) $FD_j^i$ is set to $D_{min}^{ij}$.
    (c) the function Common is called to queue routing-message events for transmission to neighboring nodes.

3. otherwise, the following steps are performed:
   (a) $FD_j^i$ is set to $RD_j^i$.
   (b) $S_j^i$ is set to the set of neighboring nodes such that for each neighbor k in the set, $D_{jk}^{i^*}$ is less than $FD_j^i$.
   (c) If $S_j^i$ is empty (after the previous step), then $RD_j^i$ is set to ∞, otherwise $RD_j^i$ is set to the minimum value of $D_{jk}^i + l_k^i$ out of all k that are members of the set $QS_j^i$.
   (d) The function MakeQueries(j) defined below is called to send routing-message events for destination j.

In the case where $a_j^i$ is false, the function Transition checks if the sets $Z_j^i$ and $S_{jP1}^i$ have any common members. If they do, then the following sequence of events is performed:
1. $RD_j^i$ is set to $D_{min}^{ij}$, $S_j^i$ is set to $S_{jP1}^i$, and $FD_j^i$ is set to $D_{min}^{ij}$ if that would decrease $FD_j^i$.
2. the function Common is called to queue routing-message events for transmission to neighboring nodes.

Otherwise, the following sequence of events is performed:
1. if $S_j^i$ is empty, then $RD_j^i$ is set to ∞, otherwise $RD_j^i$ is set to the value returned by a call to the function Choose(e, j, m, c), where the arguments passed to Choose are the same ones passed to Transition.
2. If $FD_j^i$ is not equal to ∞, then call MakeQueries(j), otherwise call Common(j). We note that j is the destination passed as an argument to Transition.

The functions MakeQueries(j) and Common(j) are simple utility functions to send messages.

MakeQueries(j) first sets the variable $\widetilde{RD}_j^i$ to $RD_j^i$ and then, for every neighbor k, MakeQueries sets $r_{jk}^i$ to true and queues a routing-message event [query, j, $RD_j^i$] for transmission to node k. If there are no available neighbors, the function MakeQueries sets $F_j^i$ to ∞, as no messages can be sent and no neighbors can be reached.

Common(j) iterates over each neighboring node ID k in $N^i$, and performs the following:
1. if k is a member of $QS_j^i$ then $D_{jk}^{i^*}$ is set to $\tilde{D}_{jk}^{i^*}$, and the routing-message event [reply, j, $RD_j^i$] is queued for transmission to node k.
2. otherwise if $RD_j^i$ is not equal to $\widetilde{RD}_j^i$, the routing-message event [update, j, $RD_j^i$] is queued for transmission to node k.

Finally, Common sets $QS_j^i$ to the empty set $\emptyset$, and sets $\widetilde{RD}_j^i$ to $RD_j^i$.

The functionality provided by MakeQueries and Common can, of course, be easily provided by other means than a function. The current description provides these purely for clarity: Common shows how one can easily avoid sending additional updates when costs have not changed, and how one can send avoid sending duplicate replies. MakeQueries shows how one can handle the case where a node has no neighbors, and therefore needs to set its feasible distance to infinity.

The functions Choose, SelectiveReply, and ChoosePassive are used in the current description to explicitly illustrate various choices that can be made, and in practice would not necessarily be provided by functions in a programming language. Various semantics for Choose, SelectiveReply, and ChoosePassive are possible. The current definitions are the best known to date, although known alternatives provide only slightly worse performance. To summarize the behavior of these functions, we note that SelectiveReply keeps one outstanding query in $QS_j^i$. If a second query arrives during an active phase, a reply will be sent for that query.

Choose returns ∞ if a diffusing computation is started by a linkdown event, or if a diffusing computation is started with a query reporting ∞. Otherwise if $QS_j^i \neq \emptyset$, it chooses $\min\{D_{jk}^i + l_k^i | k \in QS_j^i\}$, else $\min\{D_{jk}^i + l_k^i | k \in N^i \wedge \tilde{D}_{jk}^{i^*} \leq FD_j^i\}$.

ChoosePassive returns true if $\{k \in QS_j^i | \tilde{D}_{jk}^{i^*} = \infty\} = \emptyset$ and false otherwise.

An alternative for SelectiveReply is for SelectiveReply to do nothing. In this case, while convergence will be slower, this choice for SelectiveReply will ensure that, if the current nodes wishes to delete an entry, that all upstream nodes will have been notified before the current node delete's its entry. In some applications (e.g., providing shortcut routes in a bridged network), this property may be necessary for correct operation.

Embodiment in a Network Simulator

One existing embodiment of the invention is in a network simulator. The simulator uses small integers as node IDs instead of a network address (e.g., an IP address), so that tables can be implemented as arrays instead of hash tables or other data structures. Such simplifications are not significant, and the simulator does in fact contain an actual implementation of the current invention. This simulator was used to generate the tables shown in the examples in the next section.

Examples of Operation

The following examples, each for a different topology and different sequence of link changes, show the sequence of changes to variables defined in the formal description shown above. The state of each node at the start of an example or at the end of an example is called a snapshot. In between, the example provides entries at each time (measured in arbitrary units) showing (a) what routing-message events or link events a node received, and (b) what messages the node sent in response, and (c) the new state of the node. The state of the node i is described by the following arrays and tables. The arrays, whose index is the destination j given in square brackets, are named as follows:
1. dist denotes the value of $D_{min}^{ij}$.
2. repldist denotes the value of $RD_j^i$.
3. repldisttilde denotes the value of $\widetilde{RD}_j^i$.
4. FD denotes the value of $FD_j^i$.
5. DMin denotes the value of $D_{min}^{ij}$.
6. successor denotes a successor along the shortest path.

The tables are represented by a series of rows. The columns are defined as follows:
1. dest denotes the destination (i.e., node j).
2. neighbor denotes a neighboring node k.
3. dist denotes the value of $D_{jk}^i$.
4. dist* denotes the value of $D_{jk}^{i^*}$.
5. dist*denotes the value of $\tilde{D}_{jk}^{i^*}$.
6. r denotes the value of $r_{jk}^i$.
7. inS indicates if the entry in the neighbor column is a member of the set $S_j^i$. The value T indicates that it is a member and a value of F indictes that it is not a member.
8. inQS indicates if the entry in the neighbor column is a member of the set $QS_j^i$. The value T indicates that it is a member and a value of F indictes that it is not a member.
9. inZ indicates if the entry in the neighbor column is a member of the set $Z_j^i$. The value T indicates that it is a member and a value of F indictes that it is not a member.

10. lcost denotes the cost of the link connecting the current node to a neighbor (the one listed in the neighbor column on the current row.

The first example shows a linear topology, illustrated in FIG. 7, with 6 nodes ($n_1$ to $n_6$) in which initially all links have a cost of 1.0. Next, link ($n_1$, $n_2$) increases its cost to 1.5, and the routing tables are allowed to converge. At this point, the state of all the nodes are shown in the following trace.

The cost of link ($n_1$, $n_2$) is then increased to 2.0, and the behavior of each node is displayed. Once the routing tables are stable, the state of each node is printed. For simplicity, node $n_1$ is the only destination shown. The first event shown occurs at time 11 because of the time required to reach the initial state for the example. Messages are assumed to take one time unit to propagate from one node to its neighbors.

```
Elapsed time = 6
Elapaed time = 5
Snapshot for node n1:
        dist[n1] = 0
        repldist[nl] = 0
        repldisttilde[nl] = 0
        FD[n1] = 0
        Dmin[n1] = infinity
        successor[n1] = n1 (which is the destination)
        Tables.
                dest    neighbor    dist    dist*    dist*⁻    r    inS    inQS    inZ    lcost
Snapshot for node n2:
        dist[n1] = 1.5
        repldist[n1] = 1.5
        repldisttilde[n1] = 1.5
        FD[n1] = 1
        Dmin[n1] = 1.5
        successor[n1] = n1
        Tables
                dest    neighbor    dist    dist*    dist*⁻    r    inS    inQS    inZ    lcost
                n1      n1          0       0        0         F    T      F       T      1.5
                n1      n3          2.5     2        2         F    F      F       F      1
Snapshot for node n3:
        dist[n1] = 2.5
        repldist[n1] = 2.5
        repldisttilde[n1] = 2.5
        FD[n1] = 2
        Dmin[n1] = 2.5
        successor[n1] = n2
        Tables
                dest    neighbor    dist    dist*    dist*⁻    r    inS    inQS    inZ    lcost
                n1      n2          1.5     1        1         F    T      F       T      1
                n1      n4          3.5     3        3         F    F      F       F      1
Snapshot for node n4:
        dist[n1] = 3.5
        repldist[n1] = 3.5
        repldisttilde[n1] = 3.5
        FD[n1] = 3
        Dmin[n1] = 3.5
        successor[n1] = n3
        Tables
                dest    neighbor    dist    dist*    dist*⁻    r    inS    inQS    inZ    lcost
                n1      n3          2.5     2        2         F    T      F       T      1
                n1      n5          4.5     4        4         F    F      F       F      1
Snapshot for node n5:
        dist[n1] = 4.5
        repldist[n1] = 4.5
        repldisttilde[n1] = 4.5
        FD[n1] = 4
        Dmin[n1] = 4.5
        successor[n1] = n4
        Tables
                dest    neighbor    dist    dist*    dist*⁻    r    inS    inQS    inZ    lcost
                n1      n4          3.5     3        3         F    T      F       T      1
                n1      n6          5.5     5        5         F    F      F       F      1
Snapshot for node n6:
        dist[n1] = 5.5
        repldist[n1] = 5.5
        repldisttilde[n1] = 5.5
        FD[n1] = 5
        Dmin[n1] = 5.5
        successor[n1] = n5
        Tables
                dest    neighbor    dist    dist*    dist*⁻    r    inS    inQS    inZ    lcost
                n1      n5          4.5     4        4         F    T      F       T      1
At time 11 node n1 calls procedure Change:
(cost of link from n1 to n2 changing to 2)
New State for node n1
        dist[n1] = 0
```

```
                            repldist[n1] = 0
                            repldisttilde[n1] = 0
                            FD[n1] = 0
                            Dmin[n1] = infinity
                            successor[n1] = n1 (which is the destination)
                            Tables
                                    dest    neighbor    dist    dist*    dist*⁻    r    inS    inQS    inZ    lcost
At time 11 node n2 calls procedure Change:
(cost of link from n2 to n1 changing to 2)
                            sending [update, n1, 2] to n1
                            sending [update, n1, 2] to n3
New State for node n2
      dist[n1] = 2
      repldist[n1] = 2
      repldisttilde[n1] = 2
      FD[n1] = 2
      Dmin[n1] = 2
      successor[n1] = n1
      Tables
                                    dest    neighbor    dist    dist*    dist*⁻    r    inS    inQS    inZ    lcost
                                    n1      n1          0       0        0          F    T      F       T      2
                                    n1      n3          2.5     2        2          F    F      F       F      1
            at time 12, n1 ignoring n2 from update because received at destination
New State for node n1
      dist[n1] = 0
      repldist[n1] = 0
      repldisttilde[n1] = 0
      FD[n1] = 0
      Dmin[n1] = infinity
      successor[n1] = n1 (which is the destination)
      Tables
                                    dest    neighbor    dist    dist*    dist*⁻    r    inS    inQS    inZ    lcost
            at time 12, n3 received update from n2: dest = n1, dist = 2
                            sending [update, n1, 3] to n2
                            sending [update, n1, 3] to n4
New State for node n3
      dist[n1] = 2.5
      repldist[n1] = 3
      repldisttilde[n1] = 3
      FD[n1] = 2
      Dmin[n1] = 3
      successor[n1] = n2
      Tables
                                    dest    neighbor    dist    dist*    dist*⁻    r    inS    inQS    inZ    lcost
                                    n1      n2          2       1        1          F    T      F       T      1
                                    n1      n4          3.5     3        3          F    F      F       F      1
            at time 13, n2 received update from n3: dest = n1, dist = 3
New State for node n2
      dist[n1] = 2
      repldist[n1] = 2
      repldisttilde[R1] = 2
      FD[n1] = 1
      Dmin[n1] = 2
      successor[n1] = n1
      Tables
                                    dest    neighbor    dist    dist*    dist*⁻    r    inS    inQS    inZ    lcost
                                    n1      n1          0       0        0          F    T      F       T      2
                                    n1      n3          3       2        2          F    F      F       F      1
            at time 13, n4 received update fron n3: dest = n1, dist = 3
                            sending [update, n1, 4] to n3
                            sending [update, n1, 4] to n5
New State for node n4
      dist[n1] = 3 5
      repldist[n1] = 4
      repldisttilde[n1] = 4
      FD[n1] = 3
      Dmin[n1] = 4
      successor[n1] = n3
      Tables
                                    dest    neighbor    dist    dist*    dist*⁻    r    inS    inQS    inZ    lcost
                                    n1      n3          3       2        2          F    T      F       T      1
                                    n1      n5          4.5     4        4          F    F      F       F      1
            at time 14, n3 received update from n4: dest = n1, dist = 4
New State for node n3
      dist[n1] = 3
      repldist[n1] = 3
      repldisttilde[n1] = 3
      FD[n1] = 2
      Dmin[n1] = 3
      successor[n1] = n2
```

-continued

Tables

| dest | neighbor | dist | dist* | dist*⁻ | r | inS | inQS | inZ | lcost |
|---|---|---|---|---|---|---|---|---|---|
| n1 | n2 | 2 | 1 | 1 | F | T | F | T | 1 |
| n1 | n4 | 4 | 3 | 3 | F | F | F | F | 1 | at time 14, n5 received update from n4: dest = n1, dist = 4
               sending [update, n1, 5] to n4
               sending [update, n1, 5] to n6

New State for node n5
       dist[n1] = 4.5
       repldist[n1] = 5
       repldisttilde[n1] = 5
       FD[n1] = 4
       Dmin[n1] = 5
       successor[n1] = n4
       Tables

| dest | neighbor | dist | dist* | dist*⁻ | r | inS | inQS | inZ | lcost |
|---|---|---|---|---|---|---|---|---|---|
| n1 | n4 | 4 | 3 | 3 | F | T | F | T | 1 |
| n1 | n6 | 5.5 | 5 | 5 | F | F | F | F | 1 | at time 15, n4 received update fron n5: dest = n1, dist = 5

New State for node n4
       dist[n1] = 4
       repldist[n1] = 4
       repldisttilde[n1] = 4
       FD[n1] = 3
       Dmin[n1] = 4
       successor[n1] = n3
       Tables

| dest | neighbor | dist | dist* | dist*⁻ | r | inS | inQS | inZ | lcost |
|---|---|---|---|---|---|---|---|---|---|
| n1 | n3 | 3 | 2 | 2 | F | T | F | T | 1 |
| n1 | n5 | 5 | 4 | 4 | F | F | F | F | 1 | at time 15, n6 received update from n5: dest = n1, dist = 5
               sending [update, n1, 6] to n5

New State for node n6
       dist[n1] = 5.5
       repldist[n1] = 6
       repldisttilde[n1] = 6
       FD[n1] = 5
       Dmin[n1] = 6
       successor[n1] = n5
       Tables

| dest | neighbor | dist | dist* | dist*⁻ | r | inS | inQS | inZ | lcost |
|---|---|---|---|---|---|---|---|---|---|
| n1 | n5 | 5 | 4 | 4 | F | T | F | T | 1 | at time 16, n5 received update from n6: dest = n1, dist = 6

New State for node n5
       dist[n1] = 5
       repldist[n1] = 5
       repldisttilde[n1] = 5
       FD[n1] = 4
       Dmin[n1] = 5
       successor[n1] = n4
       Tables

| dest | neighbor | dist | dist* | dist*⁻ | r | inS | inQS | inZ | lcost |
|---|---|---|---|---|---|---|---|---|---|
| n1 | n4 | 4 | 3 | 3 | F | T | F | T | 1 |
| n1 | n6 | 6 | 5 | 5 | F | F | F | F | 1 |

Elapsed time = 5
Snapshot for node n1:
       dist[n1] = 0
       repldist[n1] = 0
       repldisttilde[n1] = 0
       FD[n1] = 0
       Dmin[n1] = infinity
       successor[n1] = n1 (which is the destination)
       Tables

| dest | neighbor | dist | dist* | dist*⁻ | r | inS | inQS | inZ | lcost |
|---|---|---|---|---|---|---|---|---|---|

Snapshot for node n2:
       dist[n1] = 2
       repldist[n1] = 2
       repldisttilde[n1] = 2
       FD[n1] = 1
       Dmin[n1] = 2
       successor[n1] = n1
       Tables

| dest | neighbor | dist | dist* | dist*⁻ | r | inS | inQS | inZ | lcost |
|---|---|---|---|---|---|---|---|---|---|
| n1 | n1 | 0 | 0 | 0 | F | T | F | T | 2 |
| n1 | n3 | 3 | 2 | 2 | F | F | F | F | 1 |

Snapshot for node n3:
       dist[n1] = 3
       repldist[n1] = 3
       repldisttilde[n1] = 3
       FD[n1] = 2

-continued

```
        Dmin[n1] = 3
        successor[n1] = n2
        Tables
                dest    neighbor    dist    dist*   dist*⁻   r   inS   inQS   inZ   lcost
                n1      n2          2       1       1        F   T     F      T     1
                n1      n4          4       3       3        F   F     F      F     1
Snapshot for node n4:
        dist[n1] = 4
        repldist [n1] = 4
        repldisttilde[n1] = 4
        FD[n1] = 3
        Dmin[n1] = 4
        successor[n1] = n3
        Tables
                dest    neighbor    dist    dist*   dist*⁻   r   inS   inQS   inZ   lcost
                n1      n3          3       2       2        F   T     F      T     1
                n1      n5          5       4       4        F   F     F      F     1
Snapshot for node n5:
        dist[n1] = 5
        repldist[n1] = 5
        repldisttilde[n1] = 5
        FD[n1] = 4
        Dmin[n1] = 5
        successor[n1] = n4
        Tables
                dest    neighbor    dist    dist*   dist*⁻   r   inS   inQS   inZ   lcost
                n1      n4          4       3       3        F   T     F      T     1
                n1      n6          6       5       5        F   F     F      F     1
Snapshot for node n6:
        dist[n1] = 6
        repldist[n1] = 6
        repldisttilde[n1] = 6
        FD[n1] = 5
        Dmin[n1] = 6
        successor[n1] = n5
        Tables
                dest    neighbor    dist    dist*   dist*⁻   r   inS   inQS   inZ   lcost
                n1      n5          5       4       4        F   T     F      T     1
```

The above example shows that a node can see increasing link costs and using the present invention, only updates will be needed, so there are no diffusing computations. Prior art systems using SNC would in this case require a diffusing computation.

The second example shows a topology, illustrated in FIG. 8, in which initially all links have a cost of 1.0 except link $(n_2, n_4)$, which has a cost of 3.0. At this point, the state of all nodes are shown in the following trace. Then the cost of link $(n_2, n_3)$ increases from 1.0 to 5.0. A half time unit later, the cost of link $(n_2, n_4)$ decreases from 3.0 to 1.0. The behavior of each node is shown until the routing tables converge. At this point, all the tables are printed to show the final state. The first event shown occurs at time 5.0 because of the time required to reach the initial state for the example. Subsequent events are spaced by 0.5 time units because of the starting time for the second link-cost change. Messages are assumed to take one time unit to propagate from one node to its neighbors.

```
Elapsed time = 5
Snapshot for node n1:
        dist[n1] = 0
        repldist[n1] = 0
        repldisttilde[n1] = 0
        FD[n1] = 0
        Dmin[n1] = infinity
        successor[n1] = n1 (which is the destination)
        Tables
                dest    neighbor    dist    dist*   dist*⁻   r   inS   inQS   inZ   lcost
Snapshot for node n2:
        dist[n1] = 1
        repldist[n1] = 1
        repldisttilde[n1] = 1
        FD[n1] = 1
        Dmin[n1] = 1
        successor[n1] = n1
        Tables
                dest    neighbor    dist    dist*   dist*⁻   r   inS   inQS   inZ   lcost
                n1      n1          0       0       0        F   T     F      T     1
                n1      n3          2       2       2        F   F     F      F     1
                n1      n4          4       4       4        F   F     F      F     3
```

-continued

Snapshot for node n3:
    dist[n1] = 2
    repldist[n1] = 2
    repldisttilde[n1] = 2
    FD[n1] = 2
    Dmin[n1] = 2
    successor[n1] = n2
    Tables

| dest | neighbor | dist | dist* | dist*⁻ | r | inS | inQS | inZ | lcost |
|---|---|---|---|---|---|---|---|---|---|
| n1 | n2 | 1 | 1 | 1 | F | T | F | T | 1 |
| n1 | n5 | 3 | 3 | 3 | F | F | F | F | 1 |

Snapshot for node n4:
    dist[n1] = 4
    repldist [n1] = 4
    repldisttilde[n1] = 4
    FU[n1] = 4
    Dmin[n1] = 4
    successor[n1] = n2
    Tables

| dest | neighbor | dist | dist* | dist*⁻ | r | inS | inQS | inZ | lcost |
|---|---|---|---|---|---|---|---|---|---|
| n1 | n2 | 1 | 1 | 1 | F | T | F | T | 3 |
| n1 | n5 | 3 | 3 | 3 | F | T | F | T | 1 |

Snapshot for node n5:
    dist[n1] = 3
    repldist[n1] = 3
    repldissttilde[n1] = 3
    FD[n1] = 3
    Dmin[n1] = 3
    successor[n1] = n3
    Tables

| dest | neighbor | dist | dist* | dist*⁻ | r | inS | inQS | inZ | lcost |
|---|---|---|---|---|---|---|---|---|---|
| n1 | n3 | 2 | 2 | 2 | F | T | F | T | 1 |
| n1 | n4 | 4 | 4 | 4 | F | F | F | F | 1 |
| n1 | n6 | 4 | 4 | 4 | F | F | F | F | 1 |

Snapshot for node n6:
    dist[n1] = 4
    repldist[n1] = 4
    repldisttilde[n1] = 4
    FD[n1] = 4
    Dmin[n1] = 4
    successor[n1] = n5
    Tables

| dest | neighbor | dist | dist* | dist*⁻ | r | inS | inQS | inZ | lcost |
|---|---|---|---|---|---|---|---|---|---|
| n1 | n5 | 3 | 3 | 3 | F | T | F | T | 1 |
| n1 | n7 | 5 | 5 | 5 | F | F | F | F | 1 |

Snapshot for node n7:
    dist[n1] = 5
    repldist[n1] = 5
    repldisttilde[n1] = 5
    FD[n1] = 5
    Dmin[n1] = 5
    successor[n1] = n8
    Tables

| dest | neighbor | dist | dist* | dist*⁻ | r | inS | inQS | inZ | lcost |
|---|---|---|---|---|---|---|---|---|---|
| n1 | n6 | 4 | 4 | 4 | F | T | F | T | 1 |
| n1 | n5 | 4 | 4 | 4 | F | T | F | T | 1 |

Snapshot for node n8:
    dist[n1] = 4
    repldist[n1] = 4
    repldisttilde[n1] = 4
    FD[n1] = 4
    Dmin[n1] = 4
    successor[n1] = n9
    Tables

| dest | neighbor | dist | dist* | dist*⁻ | r | inS | inQS | inZ | lcost |
|---|---|---|---|---|---|---|---|---|---|
| n1 | n7 | 5 | 5 | 5 | F | F | F | F | 1 |
| n1 | n9 | 3 | 3 | 3 | F | T | F | T | 1 |

Snapshot for node n9:
    dist[n1] = 3
    repldist[n1] = 3
    repldisttilde[n1] = 3
    FD[n1] = 3
    Dmin[n1] = 3
    successor[n1] = n10
    Tables

| dest | neighbor | dist | dist* | dist*⁻ | r | inS | inQS | inZ | lcost |
|---|---|---|---|---|---|---|---|---|---|
| n1 | n8 | 4 | 4 | 4 | F | F | F | F | 1 |
| n1 | n10 | 2 | 2 | 2 | F | T | F | T | 1 |

Snapshot for node n10:
    dist[n1] = 2

```
        repldist [n1] = 2
        repldisttilde[n1] = 2
        FD[n1] = 2
        Dmin[n1] = 2
        successor[n1] = n1
        Tables
                dest   neighbor   dist   dist*   dist*⁻   r   inS   inQS   inZ   lcost
                n1     n9         3      3       3        F   F     F      F     1
                n1     n1         0      0       0        F   T     F      T     2
At time 5 node n2 calls procedure Change:
(cost of link from n2 to n3 changing to 5)
New State for node n2
        dist[n1] = 1
        repldist[n1] = 1
        repldisttilde[n1] = 1
        FD[n1] = 1
        Dmin[n1] = 1
        successor[n1] = n1
        Tables
                dest   neighbor   dist   dist*   dist*⁻   r   inS   inQS   inZ   lcost
                n1     n1         0      0       0        F   T     F      T     1
                n1     n3         2      2       2        F   F     F      F     5
                n1     n4         4      4       4        F   F     F      F     3
At time 5 node n3 calls procedure Change:
(cost of link from n3 to n2 changing to 5)
                broadcasting [query, n1, 6] to all neighbors
New State for node n3
        dist[n1] = 6
        repldist[n1] = 6
        repldisttilde[n1] = 6
        FD[n1] = 2
        Dmin[n1] = 4
        successor[n1] = n2
        Tables
                dest   neighbor   dist   dist*   dist*⁻   r   inS   inQS   inZ   lcost
                n1     n2         1      1       1        T   T     F      F     5
                n1     n5         3      3       3        T   F     F      T     1
At time 5.5 node n2 calls procedure Change:
(cost of link fron n2 to n4 changing to 1)
New State for node n2
        dist[n1] = 1
        repldist[n1] = 1
        repldisttilde[n1] = 1
        FD[n1] = 1
        Dmin[n1] = 1
        successor[n1] = n1
        Tables
                dest   neighbor   dist   dist*   dist*⁻   r   inS   inQS   inZ   lcost
                n1     n1         0      0       0        F   T     F      T     1
                n1     n3         2      2       2        F   F     F      F     5
                n1     n4         4      4       4        F   F     F      F     1
At time 5.5 node n4 calls procedure Change:
(cost of link fron n4 to n2 changing to 1)
                sending [update, n1, 2] to n2
                sending [update, n1, 2] to n5
New State for node n4
        dist[n1] = 2
        repldist[n1] = 2
        repldisttilde[n1] = 2
        FD[n1] = 2
        Dmin[n1] = 2
        successor[n1] = n2
        Tables
                dest   neighbor   dist   dist*   dist*⁻   r   inS   inQS   inZ   lcost
                n1     n2         1      1       1        F   T     F      T     1
                n1     n5         3      3       3        F   F     F      F     1
        at time 6, n2 received query from n3: dest = n1, dist = 6
                sending [reply, n1, 1] to n3
New State for node n2
        dist[n1] = 1
        repldist[n1] = 1
        repldisttilde[n1] = 1
        FD[n1] = 1
        Dmin[n1] = 1
        successor[n1] = n1
        Tables
                dest   neighbor   dist   dist*   dist*⁻   r   inS   inQS   inZ   lcost
                n1     n1         0      0       0        F   T     F      T     1
                n1     n3         6      6       6        F   F     F      F     5
                n1     n4         4      4       4        F   F     F      F     1
```

-continued at time 6, n5 received query from n3: dest = n1, dist = 6
  broadcasting [query, n1, 7] to all neighbors
New State for node n5
  dist[n1] = 3
  repldist[n1] = 7
  repldisttilde[n1] = 7
  FD[n1] = 3
  Dmin[n1] = 5
  successor[n1] = n3
  Tables

| dest | neighbor | dist | dist* | dist*⁻ | r | inS | inQS | inZ | lcost |
|---|---|---|---|---|---|---|---|---|---|
| n1 | n3 | 6 | 2 | 6 | T | T | T | F | 1 |
| n1 | n4 | 4 | 4 | 4 | T | F | F | T | 1 |
| n1 | n6 | 4 | 4 | 4 | T | F | F | T | 1 | at time 6.5, n2 received update from n4: dest = n1, dist = 2
New State for node n2
  dist[n1] = 1
  repldist[n1] = 1
  repldisttilde[n1] = 1
  FD[n1] = 1
  Dmin[n1] = 1
  successor[n1] = n1
  Tables

| dest | neighbor | dist | dist* | dist*⁻ | r | inS | inQS | inZ | lcost |
|---|---|---|---|---|---|---|---|---|---|
| n1 | n1 | 0 | 0 | 0 | F | T | F | T | 1 |
| n1 | n3 | 6 | 6 | 6 | F | F | F | F | 5 |
| n1 | n4 | 2 | 2 | 2 | F | F | F | F | 1 | at time 6.5, n5 received update from n4: dest = n1, dist = 2
  sending [reply, n1, 3] to n3
  sending [update, n1, 3] to n4
  sending [update, n1, 3] to n6
New State for node n5
  dist[n1] = 7
  repldist [n1] = 3
  repldisttilde[n1] = 3
  FD[n1] = 3
  Dmin[n1] = 3
  successor[n1] = n3
  Tables

| dest | neighbor | dist | dist* | dist*⁻ | r | inS | inQS | inZ | lcost |
|---|---|---|---|---|---|---|---|---|---|
| n1 | n3 | 6 | 6 | 6 | T | F | F | F | 1 |
| n1 | n4 | 2 | 2 | 2 | T | T | F | T | 1 |
| n1 | n6 | 4 | 4 | 4 | T | F | F | F | 1 | at time 7, n3 received reply from n2: dest = n1, dist = 1
New State for node n3
  dist[n1] = 6
  repldist [n1] = 6
  repldisttilde[n1] = 6
  FD[n1] = 2
  Dmin[n:1] = 4
  successor[n1] = n2
  Tables

| dest | neighbor | dist | dist* | dist*⁻ | r | inS | inQS | inZ | lcost |
|---|---|---|---|---|---|---|---|---|---|
| n1 | n2 | 1 | 1 | 1 | F | T | F | F | 5 |
| n1 | n5 | 3 | 3 | 3 | T | F | F | T | 1 | at time 7, n4 received query from n5: dest = n1, dist = 7
  sending [reply, n1, 2] to n5
New State for node n4
  dist[n1] = 2
  repldist[n1] = 2
  repldisttilde[n1] = 2
  FD[n1] = 2
  Dmin[n1] = 2
  successor[n1] = n2
  Tables

| dest | neighbor | dist | dist* | dist*⁻ | r | inS | inQS | inZ | lcost |
|---|---|---|---|---|---|---|---|---|---|
| n1 | n2 | 1 | 1 | 1 | F | T | F | T | 1 |
| n1 | n5 | 7 | 7 | 7 | F | F | F | F | 1 | at time 7, n6 received query from n5: dest = n1, dist = 7
  broadcasting [query, n1, 8] to all neighbors
New State for node n6
  dist[n1] = 4
  repldist[n1] = 8
  repldisttilde[n1] = 8
  FD[n1] = 4
  Dmin[n1] = 6
  successor[n1] = n5
  Tables

| dest | neighbor | dist | dist* | dist*⁻ | r | inS | inQS | inZ | lcost |
|---|---|---|---|---|---|---|---|---|---|
| n1 | n5 | 7 | 3 | 7 | T | T | T | F | 1 |

-continued

|  | dest | neighbor | dist | dist* | dist*⁻ | r | inS | inQS | inZ | lcost |
|---|---|---|---|---|---|---|---|---|---|---|
|  | n1 | n7 | 5 | 5 | 5 | T | F | F | T | 1 | at time 7, n3 received query from n5: dest = n1, dist = 7
    sending [reply, n1, 6] to n5

New State for node n3
    dist[n1] = 6
    repldist[n1] = 6
    repldisttilde[n1] = 6
    FD[n1] = 2
    Dmin[n1] = 6
    successor[n1] = n2
    Tables

|  | dest | neighbor | dist | dist* | dist*⁻ | r | inS | inQS | inZ | lcost |
|---|---|---|---|---|---|---|---|---|---|---|
|  | n1 | n2 | 1 | 1 | 1 | F | T | F | T | 5 |
|  | n1 | n5 | 7 | 7 | 7 | T | F | F | F | 1 | at time 7.5, n3 received reply from n5: dest = n1, dist = 3
    sending [update, n1, 4] to n2
    sending [update, n1, 4] to n5

New State for node n3
    dist[n1] = 6
    repldist[n1] = 4
    repldisttilde[n1] = 4
    FD[n1] = 4
    Dmin[n1] = 4
    successor[n1] = n2
    Table

|  | dest | neighbor | dist | dist* | dist*⁻ | r | inS | inQS | inZ | lcost |
|---|---|---|---|---|---|---|---|---|---|---|
|  | n1 | n2 | 1 | 1 | 1 | F | T | F | F | 5 |
|  | n1 | n5 | 3 | 3 | 3 | F | T | F | T | 1 | at time 7.5, n4 received update from n5: dest = n1, dist = 3

New State for node n4
    dist[n1] = 2
    repldist[n1] = 2
    repldisttilde[n1] = 2
    FD[n1] = 2
    Dmin[n1] = 2
    successor[n1] = n2
    Tables

|  | dest | neighbor | dist | dist* | dist*⁻ | r | inS | inQS | inZ | lcost |
|---|---|---|---|---|---|---|---|---|---|---|
|  | n1 | n2 | 1 | 1 | 1 | F | T | F | T | 1 |
|  | n1 | n5 | 3 | 3 | 3 | F | F | F | F | 1 | at time 7.5, n6 received update from n5: dest = n1, dist = 3
    sending [reply, n1, 4] to n5
    sending [update, n1, 4] to n7

New State for node n6
    dist[n1] = 8
    repldist [n1] = 4
    repldisttilde[n1] = 4
    FD[n1] = 4
    Dmin[n1] = 4
    successor[n1] = n5
    Tables

|  | dest | neighbor | dist | dist* | dist*⁻ | r | inS | inQS | inZ | lcost |
|---|---|---|---|---|---|---|---|---|---|---|
|  | n1 | n5 | 3 | 3 | 3 | T | T | F | T | 1 |
|  | n1 | n7 | 5 | 5 | 5 | T | F | F | F | 1 | at time 8, n5 received reply from n4: dest = n1, dist = 2

New State for node n5
    dist[n1] = 3
    repldist[n1] = 3
    repldisttilde[n1] = 3
    FD[n1] = 3
    Dmin[n1] = 3
    successor[n1] = n4
    Tables

|  | dest | neighbor | dist | dist* | dist*⁻ | r | inS | inQS | inZ | lcost |
|---|---|---|---|---|---|---|---|---|---|---|
|  | n1 | n3 | 6 | 6 | 6 | T | F | F | F | 1 |
|  | n1 | n4 | 2 | 2 | 2 | F | T | F | T | 1 |
|  | n1 | n6 | 4 | 4 | 4 | T | F | F | F | 1 | at time 8, n7 received query from n6: dest = n1, dist = 8
sending [reply, n1, 5] to n6

New State for node n7
    dist[n1] = 5
    repldist[n1] = 5
    repldisttilde[n1] = 5
    FD[n1] = 5
    Dmin[n1] = 5
    successor[n1] = n8
    Tables

|  | dest | neighbor | dist | dist* | dist*⁻ | r | inS | inQS | inZ | lcost |
|---|---|---|---|---|---|---|---|---|---|---|
|  | n1 | n6 | 8 | 8 | 8 | F | F | F | F | 1 |
|  | n1 | n8 | 4 | 4 | 4 | F | T | F | T | 1 | at time 8, n5 received query from n6: dest = n1, dist = 8
sending [reply, n1, 3] to n6

New State for node n5
    dist[n1] = 3
    repldist[n1] = 3
    repldisttilde[n1] = 3
    FD[n1] = 3
    Dmin[n1] = 3
    successor[n1] = n4
    Tables

| dest | neighbor | dist | dist* | dist*⁻ | r | inS | inQS | inZ | lcost |
|------|----------|------|-------|--------|---|-----|------|-----|-------|
| n1 | n3 | 6 | 6 | 6 | T | F | F | F | 1 |
| n1 | n4 | 2 | 2 | 2 | F | T | F | T | 1 |
| n1 | n6 | 8 | 8 | 8 | T | F | F | F | 1 | at time 8, n5 received reply from n3: dest = n1, dist = 6

New State for node n5
    dist[n1] = 3
    repldist[n1] = 3
    repldiisttilde[n1] = 3
    FD[n1] = 3
    Dmin[n1] = 3
    successor[n1] = n4
    Tables

| dest | neighbor | dist | dist* | dist*⁻ | r | inS | inQS | inZ | lcost |
|------|----------|------|-------|--------|---|-----|------|-----|-------|
| n1 | n3 | 6 | 6 | 6 | F | F | F | F | 1 |
| n1 | n4 | 2 | 2 | 2 | F | T | F | T | 1 |
| n1 | n6 | 8 | 8 | 8 | T | F | F | F | 1 | at time 8.5, n2 received update from n3: dest = n1, dist = 4

New State for node n2
    dist[n1] = 1
    repldist[n1] = 1
    repldisttilde[n1] = 1
    FD[n1] = 1
    Dmin[n1] = 1
    successor[n1] = n1
    Tables

| dest | neighbor | dist | dist* | dist*⁻ | r | inS | inQS | inZ | lcost |
|------|----------|------|-------|--------|---|-----|------|-----|-------|
| n1 | n1 | 0 | 0 | 0 | F | T | F | T | 1 |
| n1 | n3 | 4 | 4 | 4 | F | F | F | F | 5 |
| n1 | n4 | 2 | 2 | 2 | F | F | F | F | 1 | at time 8.5, n2 received update from n3: dest = R1, dist = 4

New State for node n5
    dist[n1] = 3
    repldist[n1] = 3
    repldisttilde[n1] = 3
    FD[n1] = 3
    Dmin[n1] = 3
    successor[n1] = n4
    Table

| dest | neighbor | dist | dist* | dist*⁻ | r | inS | inQS | inZ | lcost |
|------|----------|------|-------|--------|---|-----|------|-----|-------|
| n1 | n3 | 4 | 4 | 4 | F | F | F | F | 1 |
| n1 | n4 | 2 | 2 | 2 | F | T | F | T | 1 |
| n1 | n6 | 8 | 8 | 8 | T | F | F | F | 1 | at time 8.5, n7 received update from n6: dest = n1, dist = 4

New State for node n7
    dist[n1] = 5
    repldist[n1] = 5
    repldisttilde[n1] = 5
    FD[n1] = 5
    Dmin[n1] = 5
    successor[n1] = n8
    Tables

| dest | neighbor | dist | dist* | dist*⁻ | r | inS | inQS | inZ | lcost |
|------|----------|------|-------|--------|---|-----|------|-----|-------|
| n1 | n6 | 4 | 4 | 4 | F | T | F | T | 1 |
| n1 | n8 | 4 | 4 | 4 | F | T | F | T | 1 | at time 8.5, n5 received reply from n6: dest = n1, dist = 4

New State for node n5
    dist[n1] = 3
    repldist[n1] = 3
    repldisttilde[n1] = 3
    FD[n1] = 3
    Dmin[n1] = 3
    successor[n1] = n4
    Tables

| dest | neighbor | dist | dist* | dist*⁻ | r | inS | inQS | inZ | lcost |
|------|----------|------|-------|--------|---|-----|------|-----|-------|
| n1 | n3 | 4 | 4 | 4 | F | F | F | F | 1 |
| n1 | n4 | 2 | 2 | 2 | F | T | F | T | 1 |
| n1 | n6 | 4 | 4 | 4 | F | F | F | F | 1 | at time 9, n6 received reply from n7: dest = n1, dist = 5

New State for node n6

-continued

```
        dist[n1] = 4
        repldist[n1] = 4
        repldisttilde[n1] = 4
        FD[n1] = 4
        Dmin[n1] = 4
        successor[n1] = n5
        Tables
                dest    neighbor    dist    dist*   dist*⁻   r    inS   inQS   inZ   lcost
                n1      n5          3       3       3        T    T     F      T     1
                n1      n7          5       5       5        F    F     F      F     1
        at time 9, n6 received reply from n5: dest = n1, dist = 3
New State for node n6
        dist[n1] = 4
        repldist[n1] = 4
        repldisttilde[n1] = 4
        FD[n1] = 4
        Dmin[n1] = 4
        successor[n1] = n5
        Table
                dest    neighbor    dist    dist*   dist*⁻   r    inS   inQS   inZ   lcost
                n1      n5          3       3       3        F    T     F      T     1
                n1      n7          5       5       5        F    F     F      F     1
Total messages sent = 21
Total steps summed over all nodes = 25
Total operations summed over all nodes = 25
for node iterations for message with dest n1, max = 7, mean = 2.1 +- 2.16564
for node iterations with link change, max = 2, mean = 0.4 +- 0.663325
Distribution of node iterations by dest: 4 0 2 2 1 0 0 1
Number of nondeterministic successor choices = 0
Elapsed time = 4
Snapshot for node n1:
        dist[n1] = 0
        repldist[n1] = 0
        repldisttilde[n1] = 0
        FD[n1] = 0
        Dmin[n1] = infinity
        successor[n1] = n1 (which is the destination)
        Tables
                dest    neighbor    dist    dist*   dist*⁻   r    inS   inQS   inZ   lcost
Snapshot for node n2:
        dist[n1] = 1
        repldist[n1] = 1
        repldisttilde[n1] = 1
        FD[n1] = 1
        Dmin[n1] = 1
        successor[n1] = n1
        Tables
                dest    neighbor    dist    dist*   dist*⁻   r    inS   inQS   inZ   lcost
                n1      n1          0       0       0        F    T     F      T     1
                n1      n3          4       4       4        F    F     F      F     5
                n1      n4          2       2       2        F    F     F      F     1
Snapshot for node n3:
        dist[n1] = 4
        repldist[n1] = 4
        repldisttilde[n1] = 4
        FD[n1] = 4
        Dmin[n1] = 4
        successor[R1] = n5
        Tables
                dest    neighbor    dist    dist*   dist*⁻   r    inS   inQS   inZ   lcost
                n1      n2          1       1       1        F    T     F      F     5
                n1      n5          3       3       3        F    T     F      T     1
Snapshot for node n4:
        dist[n1] = 2
        repldist[n1] = 2
        repldisttilde[n1] = 2
        FD[n1] = 2
        Dmin[n1] = 2
        successor[n1] = n2
        Tables
                dest    neighbor    dist    dist*   dist*⁻   r    inS   inQS   inZ   lcost
                n1      n2          1       1       1        F    T     F      T     1
                n1      n5          3       3       3        F    F     F      F     1
Snapshot for node n5:
        dist[n1] = 3
        repldist[n1] = 3
        repldisttilde[n1] = 3
        FD[n1] = 3
        Dmin[n1] = 3
        successor[n1] = n4
```

-continued

| | Tables | | | | | | | | | |
|---|---|---|---|---|---|---|---|---|---|---|
| | dest | neighbor | dist | dist* | dist*⁻ | r | inS | inQS | inZ | lcost |
| | n1 | n3 | 4 | 4 | 4 | F | F | F | F | 1 |
| | n1 | n4 | 2 | 2 | 2 | F | T | F | T | 1 |
| | n1 | n6 | 4 | 4 | 4 | F | F | F | F | 1 |

Snapshot for node n6:
    dist[n1] = 4
    repldist[n1] = 4
    repldisttilde[n1] = 4
    FD[n1] = 4
    Dmin[n1] = 4
    successor[n1] = n5
    Tables

| | dest | neighbor | dist | dist* | dist*⁻ | r | inS | inQS | inZ | lcost |
|---|---|---|---|---|---|---|---|---|---|---|
| | n1 | n5 | 3 | 3 | 3 | F | T | F | T | 1 |
| | n1 | n7 | 5 | 5 | 5 | F | F | F | F | 1 |

Snapshot for node n7:
    dist[n1] = 5
    repldist[n1] = 5
    repldisttilde[n1] = 5
    FD[n1] = 5
    Dmin[n1] = 5
    successor[n1] = n8
    Tables

| | dest | neighbor | dist | dist* | dist*⁻ | r | inS | inQS | inZ | lcost |
|---|---|---|---|---|---|---|---|---|---|---|
| | n1 | n6 | 4 | 4 | 4 | F | T | F | T | 1 |
| | n1 | n8 | 4 | 4 | 4 | F | T | F | T | 1 |

Snapshot for node n8:
    dist[n1] = 4
    repldist[n1] = 4
    repldisttilde[n1] = 4
    FD[n1] = 4
    Dmin[n1] = 4
    successor[n1] = n9
    Tables

| | dest | neighbor | dist | dist* | dist*⁻ | r | inS | inQS | inZ | lcost |
|---|---|---|---|---|---|---|---|---|---|---|
| | n1 | n7 | 5 | 5 | 5 | F | F | F | F | 1 |
| | n1 | n9 | 3 | 3 | 3 | F | T | F | T | 1 |

Snapshot for node n9:
    dist[n1] = 3
    repldist[n1] = 3
    repldisttilde[n1] = 3
    FD[n1] = 3
    Dmin[n1] = 3
    successor[n1] = n10
    Tables

| | dest | neighbor | dist | dist* | dist*⁻ | r | inS | inQS | inZ | lcost |
|---|---|---|---|---|---|---|---|---|---|---|
| | n1 | n8 | 4 | 4 | 4 | F | F | F | F | 1 |
| | n1 | n10 | 2 | 2 | 2 | F | T | F | T | 1 |

Snapshot for node n10:
dist[n1] = 2
repldist[n1] = 2
repldisttilde[n1] = 2
FD[n1] = 2
Dmin[n1] = 2
successor[n1] = n1
Tables

| | dest | neighbor | dist | dist* | dist*⁻ | r | inS | inQS | inZ | lcost |
|---|---|---|---|---|---|---|---|---|---|---|
| | n1 | n9 | 3 | 3 | 3 | F | F | F | F | 1 |
| | n1 | n1 | 0 | 0 | 0 | F | T | F | T | 2 |

The above example illustrates how new routes can be used immediately, and how a diffusing computation can be effectively canceled. This reduces running time compared to prior art systems based on SNC—for these systems, $n_5$ would have to wait for all upstream nodes to finish their diffusing computations before the new path could be used. Thus, the present invention provides faster convergence and better use of network resources.

We claim:

1. A method of maintaining multiple loop-free paths between a source node and a destination node in a computer network, the source node being a router, a computer, or a special-purpose device; the destination node being a computer, a router, a device, or a network connected to the source node either directly or through one or more intermediate nodes; each intermediate node being a computer, a router, or a special-purpose device; and the method comprising the following steps:

(a) generating a list of neighbor nodes, each neighbor node being adjacent to and directly connected to the source node;

(b) generating a list of neighbor-node lengths, each neighbor-node length being measured on a link or an attached network from the source node to a corresponding one of the neighbor nodes;

(c) generating a list of the neighbor-to-destination lengths, each neighbor-to-destination length being measured from one of the neighbor nodes to the destination node;

(d) generating a list of the smallest value of the neighbor-to-destination length being measured from each of the neighbor nodes to the destination node;

(e) generating the shortest loop-free path length, the shortest loop-free path length representing the length of a shortest loop-free path from the source node to the destination node;

(f) generating the feasible length, the feasible length representing the smallest value of the shortest loop-free path length;

(g) selecting a successor set comprised of successor nodes, each successor node being the next node along a loop-free path from the source to the destination node;

(h) determining whether a condition has been met that may cause the source to change its set of successor nodes or its shortest loop-free path length;

(i) performing the following steps, in the event the condition has been met:

(j) selecting those neighbor nodes for whom the smallest values of their adjacent-to-destination lengths are smaller than the feasible length;

(k) storing each selected neighbor node as a successor node in the successor set, each successor node being the next node along a loop-free path from the source node to the destination node;

(l) for each neighbor node in the successor set, adding the neighbor-to-destination length to its corresponding neighbor node length, each sum forming a distance from the source node to the destination node through one of the selected neighbor nodes;

(m) storing each corresponding distance as a loop-free path length from the source node to the destination node through the given neighbor node;

(n) determining the smallest loop-free path length;

(o) storing the smallest loop-free path length as the shortest loop-free path length;

(p) selecting the neighbor nodes for whom the sum of the neighbor-to-destination length and the corresponding neighbor-node length equal the shortest path length;

(q) storing each selected neighbor in the shortest-path set.

2. The method of maintaining loop-free paths according to claim 1, wherein each generated length for the shortest loop-free path is reported by the source node to the source node's neighbor nodes.

3. The method of maintaining loop-free paths according to claim 1, wherein each generated length for the shortest loop-free path is reported by the source node to the source node's neighbor nodes at regular intervals of time.

4. The method of maintaining loop-free paths according to claim 1, wherein the step of generating a list of the smallest value of the neighbor-to-destination length being measured from each of the neighbor nodes to the destination node includes the following steps for a given neighbor node:

generating a smallest value for the neighbor-to-destination length of the given neighbor node, comparing the generated smallest value for the neighbor-to-destination length of a given neighbor node to a previously generated length for the smallest value of the neighbor-to-destination length of the same given neighbor node, and choosing the smaller of the lengths as the smallest value of the neighbor-to-destination length of a given neighbor node.

5. The method of maintaining loop-free paths according to claim 1, wherein the step of generating the feasible length comprises the steps of:

comparing the generated value for the shortest loop-free path length to a previously generated length for the feasible length; and choosing the smaller of the lengths as the feasible length.

6. The method of maintaining loop-free paths according to claim 1, wherein the step of determining whether a condition has been met that may cause the source to change its set of successor nodes or its shortest loop-free path length includes the following steps:

determining whether a length from the source node to an neighbor node has increased or decreased;

determining whether a distance reported from an neighbor node to the source node has increased or decreased, the reported distance being measured from the neighbor node to the destination node.

7. The method of maintaining loop-free paths according to claim 1, wherein the step of determining the smallest loop-free path length includes the following steps:

comparing the distance from the source node to the destination node through each neighbor node for whom the value of its adjacent-to-destination length is smaller than the source node's feasible length;

obtaining the minimum of such distances; and making the smallest loop-free path length equal to the smallest distance.

8. A method of maintaining multiple loop-free paths to every destination node among nodes within a computer network or internetwork, each node executing the method being a router, a computer, or a special-purpose device, and the method comprising the following steps:

(a) generating for each node a list of nodes that are neighbors to the node, each neighbor node being directly connected to the node;

(b) generating for each node a list of neighbor-node lengths, each neighbor-node length being measured from the node to one of its neighbor nodes;

(c) generating for each node a list of destination nodes, each destination node being connected to the node either directly or through one or multiple other nodes;

(d) generating for each node a list of neighbor-to-destination lengths, each neighbor-to-destination length being measured from one of the node's neighbor nodes to one of the node's destination nodes;

(e) generating a list of the smallest value of the neighbor-to-destination length being measured from each of the node's neighbor nodes to each of the node's destination nodes;

(f) generating for each node a list of shortest loop-free path lengths, each shortest loop-free path length representing the length of a shortest loop-free path from the node to one of the node's destination nodes;

(g) generating for each node a list of the feasible length for the node to each of the node's destination nodes, each feasible length representing the smallest value of the shortest loop-free path length from the node to a given node's destination nodes;

(h) generating for each node a set of successor nodes for each of the node's destination nodes, each successor node being the next node along a loop-free path from the node to one of the node's destination nodes;

(i) determining whether a condition has been met that may cause a given node to change its set of successor nodes or its shortest loop-free path length;

(j) in the event the condition has been met, performing the following steps:

(k) retrieving from the given node's neighbor-to-destination lengths the neighbor-to-destination lengths from each of the given node's neighbor nodes to the given destination node;

(l) selecting those neighbor nodes of the given node for whom the smallest values of their neighbor-to-destination lengths to the given destination node are smaller than the given node's feasible length to the given destination node;

(m) storing each of the given node's selected neighbor nodes for each given destination as a successor node in the successor set, each successor node being the next node along a loop-free path to a given destination;

(n) for each selected neighbor node in the given node's successor set for a given destination, adding the neighbor-to-destination length for the given destination to its corresponding neighbor node length, each sum forming a distance from the given node to the given destination node;

(o) storing each corresponding distance as a loop-free path length from the given node to the given destination node;

(p) determining the smallest loop-free path length to each of the given node's destination nodes;

(q) for each of the given node's destination nodes, storing the smallest distance as the given node's shortest loop-free path length to the given destination node;

(r) for each of the given node's destination nodes, selecting the neighbor nodes for whom the sum of the neighbor-to-destination length and the corresponding neighbor-node length equal the shortest path length from the given node to a given destination node;

(q) for each of the given node's destination nodes, storing each selected neighbor in the shortest-path set of the destination.

9. The method of maintaining loop-free paths to every destination node according to claim 8, wherein each generated length for a shortest loop-free path is reported, by the corresponding node from which the shortest loop-free path length is measured, to the corresponding node's neighbor nodes.

10. The method of maintaining loop-free paths to every destination node according to claim 8, wherein each generated length for a shortest loop-free path is reported, by the corresponding node from which the shortest loop-free path length is measured, to the corresponding node's neighbor nodes at regular intervals of time.

11. The method of maintaining loop-free paths to every destination node according to claim 8, wherein the step of generating a list of the smallest value of the neighbor-to-destination length being measured from each of the node's neighbor nodes to each of the node's destination nodes includes the following steps, the following steps being performed for each generation of each smallest value of the neighbor-to-destination length:

generating a smallest value for the neighbor-to-destination length of a given neighbor node for a given destination node;

comparing the generated smallest value for the neighbor-to-destination length of a given neighbor node for a given destination node to a previously-generated length for the smallest value of the neighbor-to-destination length of the same given neighbor node for the same given destination node; and choosing the smaller of the lengths as the smallest value of the neighbor-to-destination length of a given neighbor node for a given destination node.

12. The method of maintaining loop-free paths to every destination node according to claim 8, wherein the step of generating for each node a list of the feasible length for the node to each of the node's destination nodes includes the following steps:

generating a smallest value for shortest loop-free path;

comparing the generated smallest value for the shortest loop-free path length to a previously generated length for the smallest value of the shortest loop-free path length; and choosing the smaller of the lengths as the smallest value of the shortest loop-free path length.

13. The method of maintaining loop-free paths to every destination node according to claim 8, wherein the step of determining whether a condition has been met that may cause a given node to change its set of successor nodes or its shortest loop-free path length comprises the following steps:

determining whether a length from the given node to an neighbor node has increased or decreased;

determining whether a distance reported from an neighbor node to the given node has increased or decreased, the reported distance being measured from the neighbor node to the destination node.

14. The method of maintaining loop-free paths according to claim 8, wherein the step of determining the smallest loop-free path length to each of the given node's destination nodes comprises the following steps:

comparing the distance from the given node to the given node's destination node through each of the given node's neighbor nodes for whom the value of its adjacent-to-destination length is smaller than the given node's feasible length;

obtaining the minimum of such distances; and making the smallest loop-free path length equal to the smallest distance.

* * * * *